(12) United States Patent
Kishi et al.

(10) Patent No.: US 7,821,559 B2
(45) Date of Patent: Oct. 26, 2010

(54) PHOTOELECTRIC CONVERSION APPARATUS PROVIDED WITH ARRANGEMENT OF PLURALITY OF PIXELS EACH HAVING PLURALITY OF PHOTOELECTRIC CONVERSION DEVICES AND ACCUMULATING UNIT FOR TEMPORARILY ACCUMULATING CHARGES ACCUMULATED IN PLURALITY OF PHOTOELECTRIC CONVERSION DEVICES

(75) Inventors: Takafumi Kishi, Kawasaki (JP); Nobuhiro Takeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 459 days.

(21) Appl. No.: 11/865,849

(22) Filed: Oct. 2, 2007

(65) Prior Publication Data
US 2008/0084489 A1  Apr. 10, 2008

(30) Foreign Application Priority Data
Oct. 4, 2006 (JP) .............................. 2006-273416
Oct. 4, 2006 (JP) .............................. 2006-273417

(51) Int. Cl.
*H04N 3/14* (2006.01)
*H04N 5/335* (2006.01)

(52) U.S. Cl. ....................................... 348/308; 348/299

(58) Field of Classification Search ......... 348/299–308, 348/314; 257/215, 242
See application file for complete search history.

(56) References Cited

U.S. PATENT DOCUMENTS

| | | | | |
|---|---|---|---|---|
| 7,046,238 | B2* | 5/2006 | Mabuchi | 345/204 |
| 2006/0066741 | A1* | 3/2006 | Koizumi et al. | 348/308 |
| 2006/0119593 | A1* | 6/2006 | Mabuchi | 345/204 |
| 2006/0181628 | A1* | 8/2006 | Kishi | 348/308 |
| 2007/0003849 | A1* | 1/2007 | Shirai | 430/57.7 |
| 2008/0266434 | A1* | 10/2008 | Sugawa et al. | 348/308 |

* cited by examiner

*Primary Examiner*—Kelly L Jerabek
(74) *Attorney, Agent, or Firm*—Cowan, Liebowitz & Latman, P.C.

(57) ABSTRACT

A pixel unit in which a plurality of pixels shares an accumulating unit for temporarily accumulating charges accumulated in photoelectric conversion devices, is arranged so that a control unit of a photoelectric conversion apparatus is adapted, when an accumulated charge amount of a first photodiode exceeds a saturation charge amount, to effect control in accordance with a first operation to discharge excess charges to a floating diffusion FD, and adapted, when an accumulated charge amount of a second photodiode exceeds a saturation charge amount, to effect control in accordance with a second operation to discharge excess charges to a charge discharge area, thereby expanding a dynamic range.

15 Claims, 16 Drawing Sheets

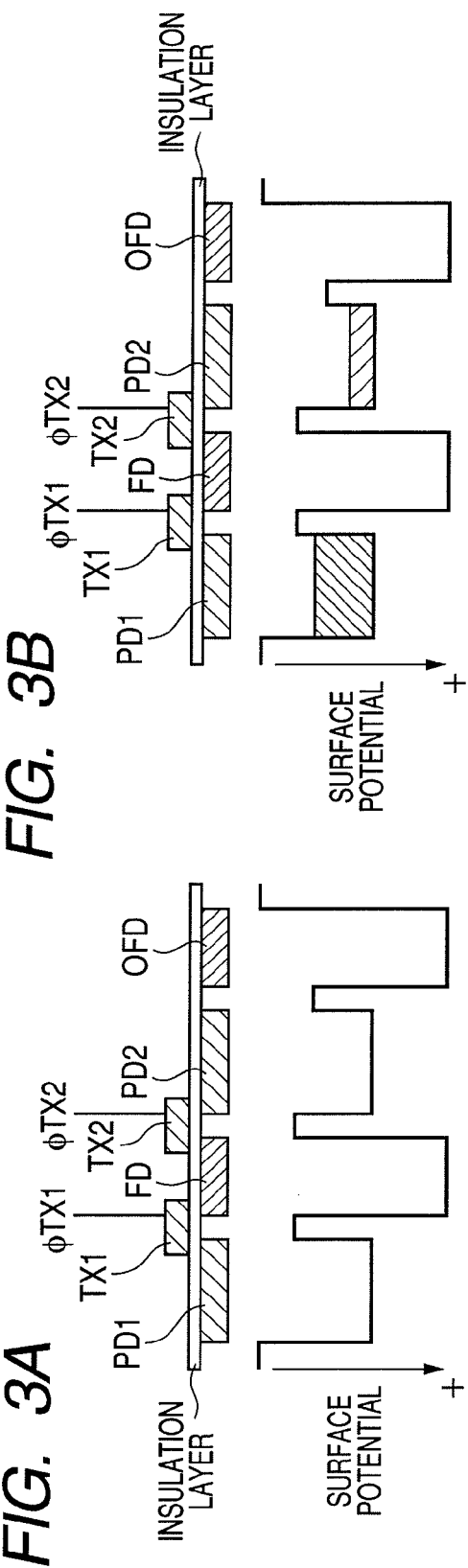
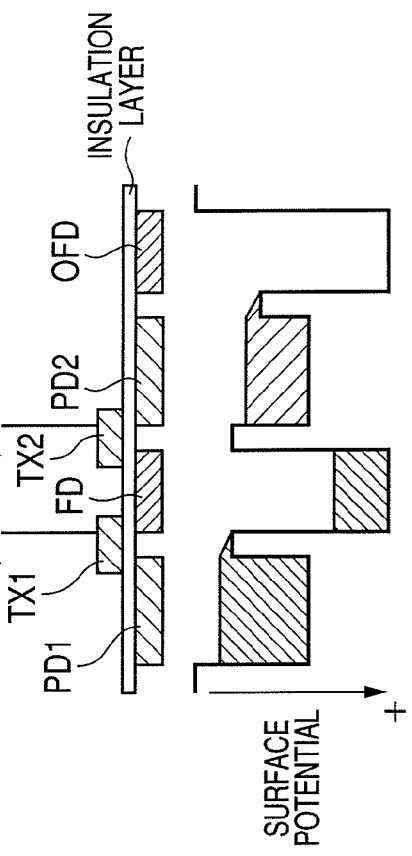
FIG. 3A
FIG. 3B
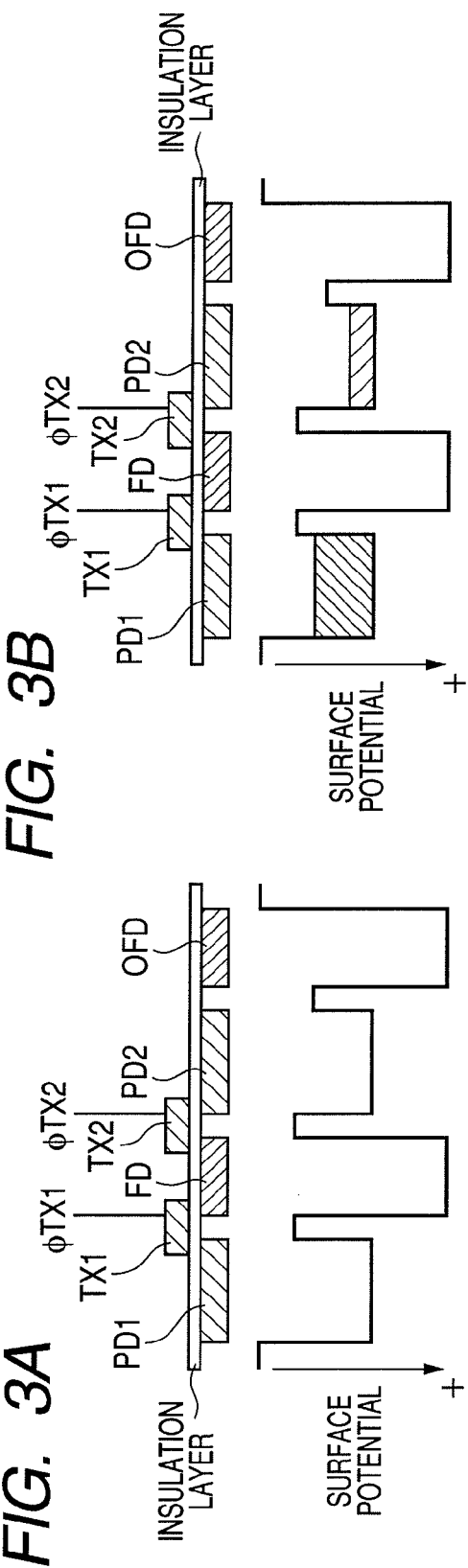
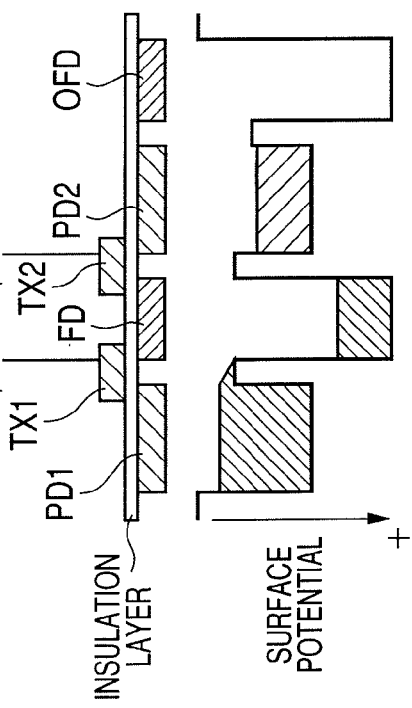
FIG. 3C
FIG. 3D

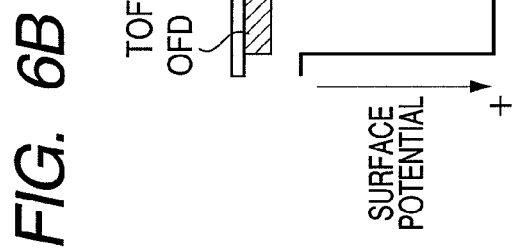
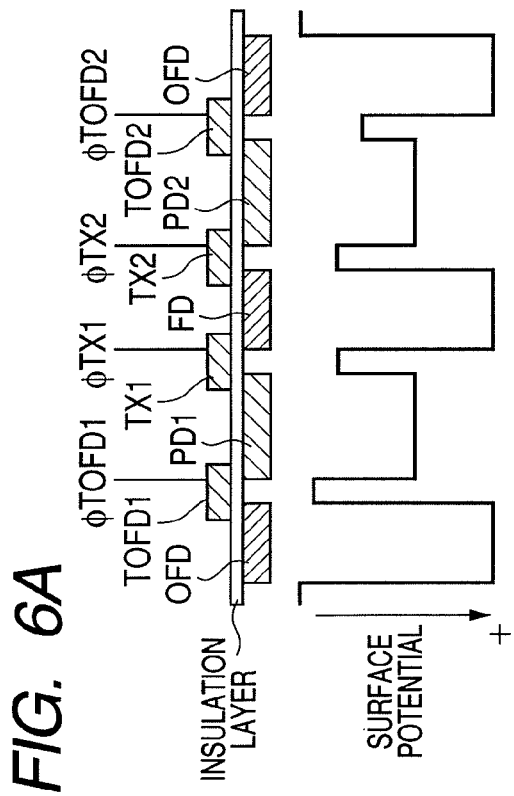
FIG. 6A
FIG. 6C
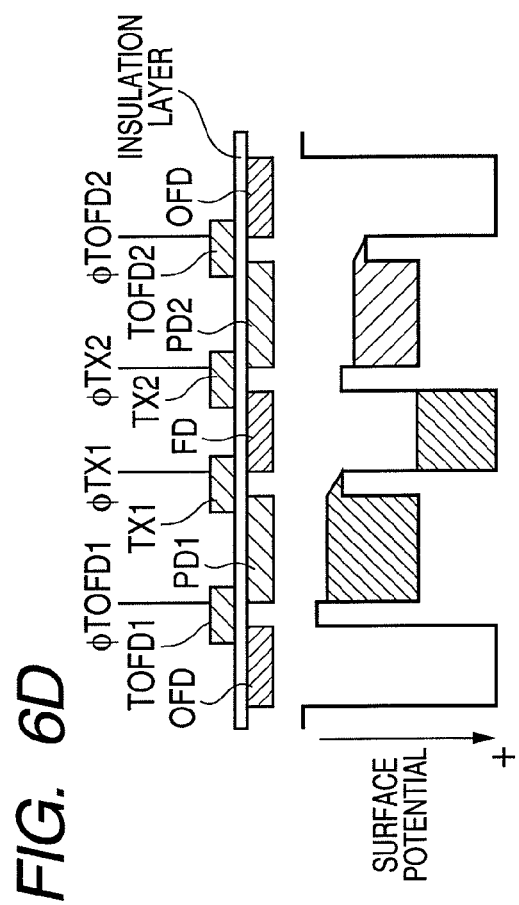
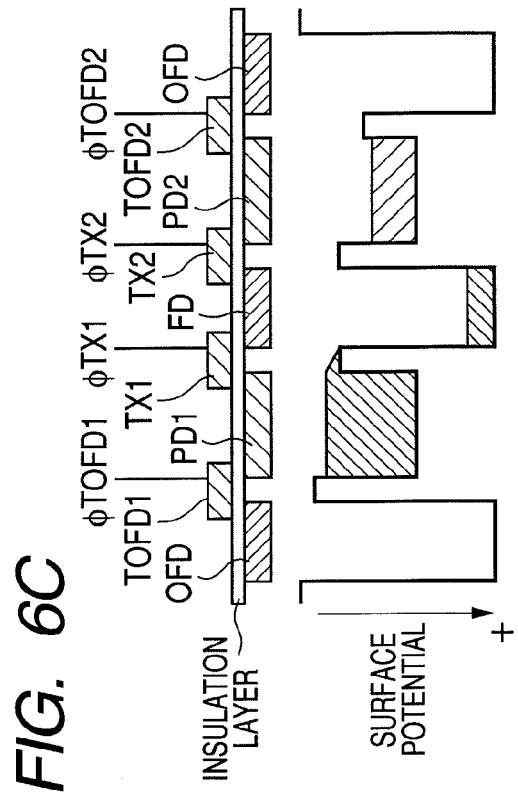
FIG. 6B
FIG. 6D

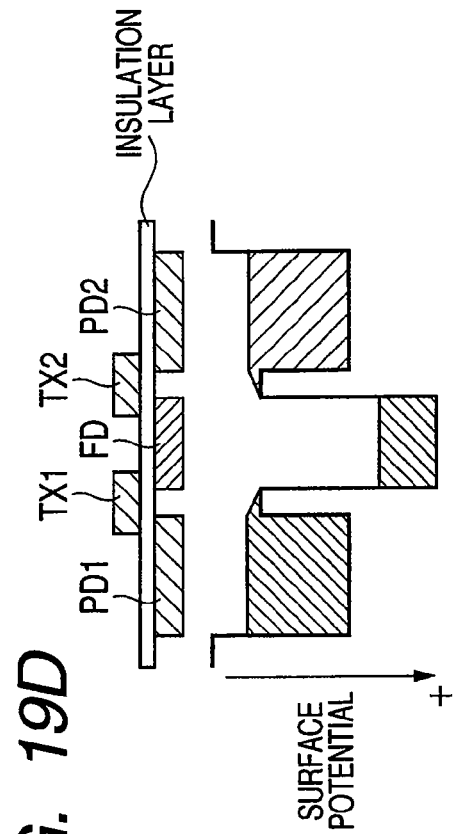
FIG. 19A (PRIOR ART)
FIG. 19B (PRIOR ART)
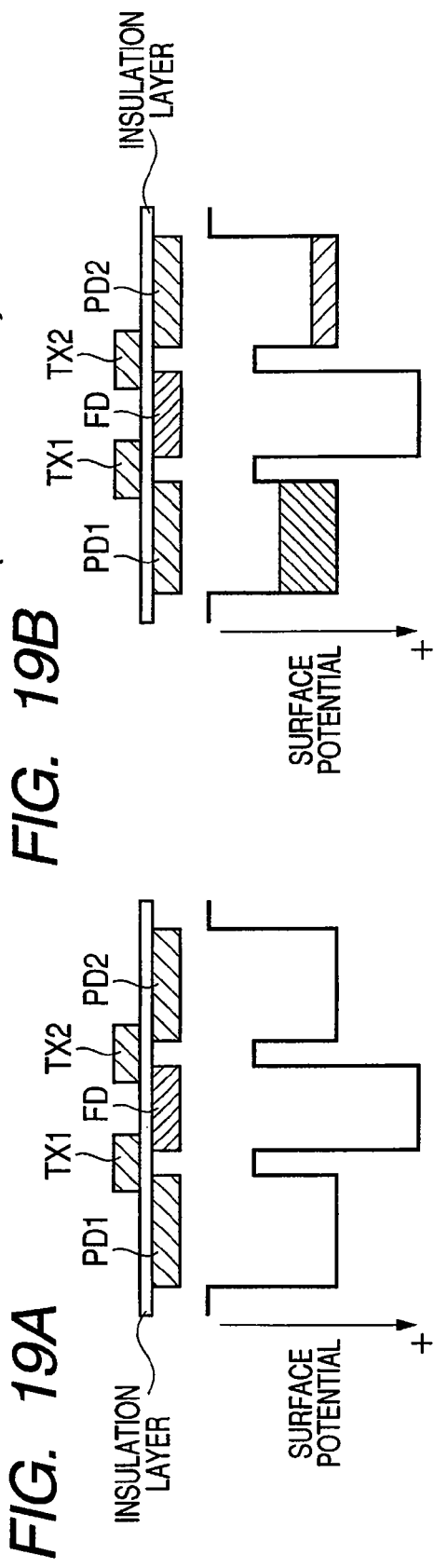
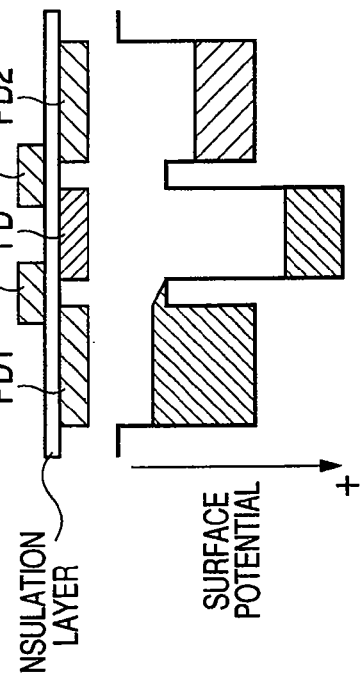
FIG. 19C (PRIOR ART)
FIG. 19D (PRIOR ART)

PHOTOELECTRIC CONVERSION APPARATUS PROVIDED WITH ARRANGEMENT OF PLURALITY OF PIXELS EACH HAVING PLURALITY OF PHOTOELECTRIC CONVERSION DEVICES AND ACCUMULATING UNIT FOR TEMPORARILY ACCUMULATING CHARGES ACCUMULATED IN PLURALITY OF PHOTOELECTRIC CONVERSION DEVICES

BACKGROUND OF THE INVENTION

1. Field of the Invention

The present invention relates to a photoelectric conversion apparatus, and a method for controlling the same, and an image pickup apparatus.

2. Description of the Related Art

Conventionally, many methods for expanding a dynamic range of an image pickup device have been proposed.

Japanese Patent Application Laid-Open No. H11-313257 discloses a technique for outputting a signal corresponding to the logarithm of light incident on a photodiode (hereinafter referred to as "PD").

Japanese Patent Application Laid-Open No. 2000-059688 discloses a technique for expanding the dynamic range by performing photoelectric conversion in both a PD and a floating diffusion (hereinafter referred to as "FD").

Japanese Patent Application Laid-Open No. 2001-177775 discloses a technique for expanding the dynamic range by transferring charges generated in a PD to a FD a plurality of times.

In an image pickup device, when signal charges accumulated in the PD exceeds a saturation signal amount, the signal charges may leak into an area having a low potential barrier. The leaking state is shown in FIGS. 18A and 18B. In FIGS. 18A and 18B, the upper part illustrates a cross-sectional constitution of each unit, and the lower part illustrates a potential distribution of the each unit. The vertical axis of the potential distribution indicates the surface potential of a semiconductor substrate under an insulation layer. A lateral position in the potential distribution illustrated in the lower part corresponds to the lateral position in the cross-sectional constitution illustrated in the upper part. FIGS. 3A to 3D, FIGS. 5A to 5D and FIGS. 19A to 19D as will be described below are also similarly illustrated. As illustrated in FIG. 18A, signal charges generated in the PD is accumulated in a parasitic capacitance of the PD. When the signal charges accumulated in the parasitic capacitance of the PD exceeds a saturation signal amount, the signal charges exceeds the potential barrier of a transfer switch TX to leak into the FD, as illustrated in FIG. 18B.

Japanese Patent Application Laid-Open No. 2003-087665 discloses a technique for expanding the dynamic range by adding the signal charges leaking into the FD to signal charges generated in the PD by utilizing the phenomenon as illustrated in FIGS. 18A and 18B.

Further, in an image pickup device in recent years, in order to reduce the size of a pixel, attempts have been made to share a circuit (signal reading circuit) arranged in the pixel and used to read out signals of a PD, among a plurality of PDs to narrow the pixel pitch.

However, in the pixel structure sharing the signal reading circuit, it is very difficult to apply the method in which the dynamic range is expanded by trapping in the FD the excess charges generated in the PD. In the following, such a situation will be described with reference to FIGS. 19A to 19D and FIG. 20.

FIGS. 19A to 19D are figures in which the upper part illustrates a cross-sectional constitution of each unit of the pixel structure, and the lower part illustrates the potential distribution of the each unit. FIG. 20 is a figure illustrating a relation between an accumulated charge amount of each unit and an exposure time. In FIG. 20, the horizontal axis represents time and the vertical axis represents the charge amount. FIG. 19A corresponds to a state of the pixel at time point t51 in FIG. 20. FIG. 19B corresponds to a state of the pixel at time point t52 in FIG. 20. FIG. 19C corresponds to a state of the pixel at time point t53 in FIG. 20. FIG. 19D corresponds to a state of the pixel at time point t54 in FIG. 20. Further, FIG. 20 respectively illustrates a relation between an accumulated charge amount and an exposure time in a PD1, a relation between an accumulated charge amount and an exposure time in PD2, and a relation between an accumulated charge amount and an exposure time in an FD. Here, among the two PDs sharing a signal reading circuit, a PD which is read first is referred to as the PD1, and a PD which is subsequently read is referred to as the PD2. Further, it is assumed that the PD1 is a pixel provided with a color filter having a higher sensitivity as compared with the PD2.

At time point t51 (corresponding to FIG. 19A), the PD1, the PD2 and the FD are reset so that signal charges start to be accumulated.

At time point t52 (corresponding to FIG. 19B), the signal charges are accumulated in the PD1 and the PD2.

At time point t53 (corresponding to FIG. 19C), the accumulated charge amount of the PD1 exceeds a saturation charge amount. In the PD1, the potential barrier on the side of the transfer switch TX1 is lowest, and hence the signal charges generated in the PD1 start to leak into the FD.

At time point t54 (corresponding to FIG. 19D), the accumulated charge amount exceeds the saturation charge amount in the PD1 and the PD2. The potential barrier on the side of a transfer switch TX2 is lowest in the PD2. Therefore, the excessive charges exceeding the saturation charge amount in the PD1 and the excessive charges exceeding the saturation charge amount in the PD2 both start to leak into the FD, and the signal charges of the PD1 and the PD2 are intermixed in the FD.

As described above, when the signal charges leak into the FD from the plurality of pixels sharing the FD, the signal charges leaking from the PDs of the both pixels are intermixed. Therefore, in an image pickup device in which color filters are regularly arranged, information on an adjacent pixel having another color filter is intermixed, so that a signal which is different from the signal to be originally obtained, is generated. As a result, in the image pickup apparatus having the pixel structure sharing the FD, it has been very difficult to trap in the FD the excess charges generated in the PD, and to thereby expand the dynamic range.

The present invention has been made in view of the above described problem. An aspect of the present invention is to expand a dynamic range in a pixel structure in which an accumulating unit for temporarily accumulating charges accumulated in photoelectric conversion devices is shared by a plurality of pixels.

SUMMARY OF THE INVENTION

According to an aspect of the present invention, a photoelectric conversion apparatus comprises pixels arranged two-dimensionally, each of which includes a first photoelectric conversion device and a second photoelectric conversion device respectively adapted to photo-electrically convert light to charges, an accumulating unit adapted to temporarily accumulate the charges accumulated in the first and second photoelectric conversion devices, and an output unit adapted to convert the charges transferred from the first and second photoelectric conversion devices to the accumulating unit to a voltage and to output the voltage, and a control unit adapted, when an accumulated charge amount of the first photoelectric conversion device exceeds a saturation charge amount, to effect control in accordance with a first operation for discharging excess charges in the first photoelectric conversion device to the accumulating unit, and adapted, when an accumulated charge amount of the second photoelectric conversion device exceeds a saturation charge amount, to effect control in accordance with a second operation for discharging excess charges in the second photoelectric conversion device to a charge discharge area.

According to another aspect of the present invention, a method for controlling a photoelectric conversion apparatus including pixels arranged two-dimensionally, each of which includes a first photoelectric conversion device and a second photoelectric conversion device respectively adapted to photo-electrically convert light to charges, an accumulating unit adapted to temporarily accumulate the charges accumulated in the first and second photoelectric conversion devices, and an output unit adapted to convert the charges transferred from the first and second photoelectric conversion devices to the accumulating unit to a voltage and to output the voltage, comprises effecting control in accordance with a first operation for discharging excess charges in the first photographic conversion device to the accumulating unit, when an accumulated charge amount of the first photoelectric conversion device exceeds a saturation charge amount, and effecting control in accordance with a second operation for discharging excess charges in the second photoelectric conversion device to a charge discharge area, when an accumulated charge amount of the second photoelectric conversion device exceeds a saturation charge amount.

According to another aspect of the present invention, a photoelectric conversion apparatus comprises: pixel units arranged two-dimensionally, each of which includes a first photoelectric conversion device and a second photoelectric conversion device respectively adapted to photo-electrically convert light to charges, an accumulating unit adapted to temporarily accumulate the charges accumulated in the first and second photoelectric conversion devices, a first transfer switch arranged between the first photoelectric conversion device and the accumulating unit, a second transfer switch arranged between the second photoelectric conversion device and the accumulating unit, and an output unit adapted to convert the charges transferred from the first and second photoelectric conversion devices to the accumulating unit to a voltage and to output the voltage; a charge discharge area; a first charge discharge switch arranged between the first photoelectric conversion device and the charge discharge area; and a second charge discharge switch arranged between the second photoelectric conversion device and the accumulating unit, wherein while charges are accumulated in the first and second photoelectric conversion devices, a first voltage is supplied to the first charge discharge switch and the second transfer switch, and a second voltage different from the first voltage is supplied to the second charge discharge switch and the first transfer switch.

According to still another aspect of the present invention, a method for controlling a photoelectric conversion apparatus including pixel units arranged teo-dimensionally, each of which includes a first photoelectric conversion device and a second photoelectric conversion device respectively adapted to photo-electrically convert light to charges, an accumulating unit adapted to temporarily accumulate the charges accumulated in the first and second photoelectric conversion devices, a first transfer switch arranged between the first photoelectric conversion device and the accumulating unit, a second transfer switch arranged between the second photoelectric conversion device and the accumulating unit, and an output unit adapted to convert the charges transferred from the first and second photoelectric conversion devices to the accumulating unit to a voltage and to output the voltage, comprises supplying a first voltage to the first charge discharge switch arranged between the first photoelectric conversion device and a charge discharge area, and the second transfer switch, and supplying a second voltage different from the first voltage to the second charge discharge switch arranged between the second photoelectric conversion device and the accumulating unit, and the first transfer switch, while charges are being accumulated in the first and second photoelectric conversion devices.

Further features of the present invention will become apparent from the following description of exemplary embodiments with reference to the attached drawings.

BRIEF DESCRIPTION OF THE DRAWINGS

FIGS. 3A, 3B, 3C and 3D are figures illustrating a positional relation between photodiodes and an FD, and their potentials according to the exemplary embodiment of the present invention.

FIGS. 6A, 6B, 6C and 6D are figures illustrating a positional relation between photodiodes and an FD, and their potentials in a constitution having charge discharge switches in addition to the transfer switches.

FIGS. 19A, 19B, 19C and 19D are figures illustrating a conventional cross-sectional constitution of respective units partially common to two pixels, and the potential distribution of the respective units.

DESCRIPTION OF THE EMBODIMENTS

In the following, a first embodiment according to the present invention will be described in detail with reference to the drawings.

Figure 1:
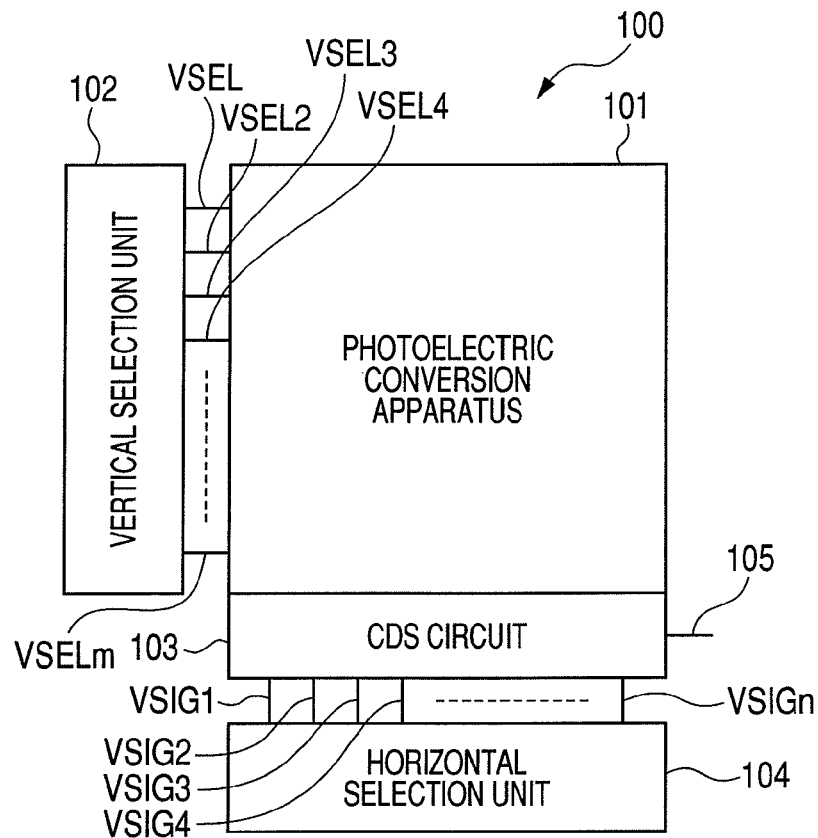
FIG. 1 is a figure illustrating a constitution of an image pickup unit according to an exemplary embodiment of the present invention.

FIG. 1 is a figure illustrating a constitution of an image pickup unit 100 according to a first embodiment of the present invention. In a photoelectric conversion apparatus 101, a plurality of pixels is arranged in the vertical direction and the horizontal direction on an image pickup surface. A vertical selection unit 102 outputs a control pulse for reading out electric signals from pixels for each of row selection lines VSEL1 to VSELm. The electric signals of the respective pixels selected by each of the row selection lines VSEL1 to VSELm, are selected by a control pulse of column selection lines VSIG1 to VSIGm applied by a horizontal selection unit 104. The outputs of the pixels selected by the control pulse of the column selection lines VSIG1 to VSIGm, are subjected to CDS (Correlated Double Sampling) processing by a CDS circuit 103. The signals processed by the CDS circuit 103 are sequentially output from an output line 105.

Figure 2:
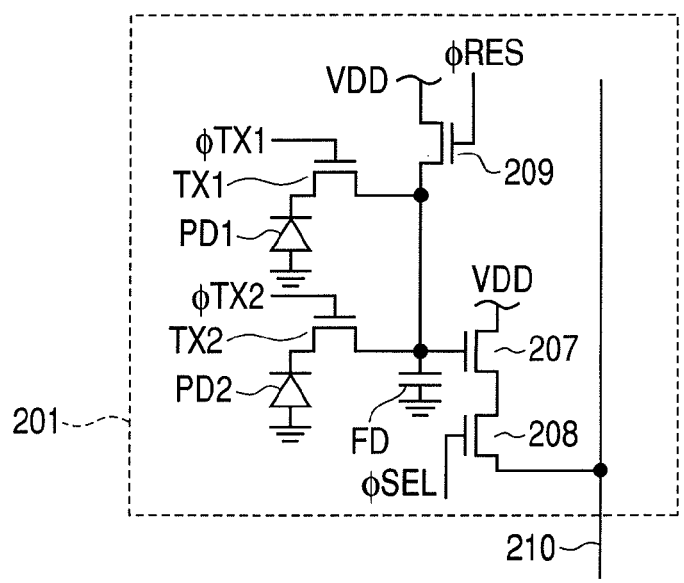
FIG. 2 is a figure illustrating a detail of pixels arranged in a photoelectric conversion apparatus.

FIG. 2 is a figure illustrating a detail of the pixels arranged in the photoelectric conversion apparatus 101 in FIG. 1. Reference numeral 201 denotes an area which includes two pixels sharing a signal reading circuit. Photodiodes PD1 and PD2 (hereinafter referred to as "PDs") convert light to charges. Transfer switches TX1 and TX2 are driven by transfer pulses φTX1 and φTX2 and transfer the charges generated in the PD1 and the PD2 to an FD, respectively.

The FD is an accumulating unit (floating diffusion) for temporarily accumulating the charges. An amplifying MOS amplifier 207 functions as a source follower. A selection switch 208 selects the pixel by a vertical selection pulse φSEL. A reset switch 209 removes the charges accumulated in the FD by a reset pulse φRES. A floating diffusion amplifier (hereinafter referred to as "FDA") is constituted of the FD, the amplifying MOS amplifier 207, and a constant current source (not shown) connected to a signal reading circuit. The signal charges of the pixel selected by the selection switch 208 are converted to a voltage, which is output to the CDS circuit 103 in FIG. 1 through a read-out output line 210. The PD1 and the PD2 are independently connected to the transfer switches TX1 and TX2, but shares the signal reading circuit constituted of the FD, the amplifying MOS amplifier 207, the selecting switch 208, and the reset switch 209.

Figure 4:
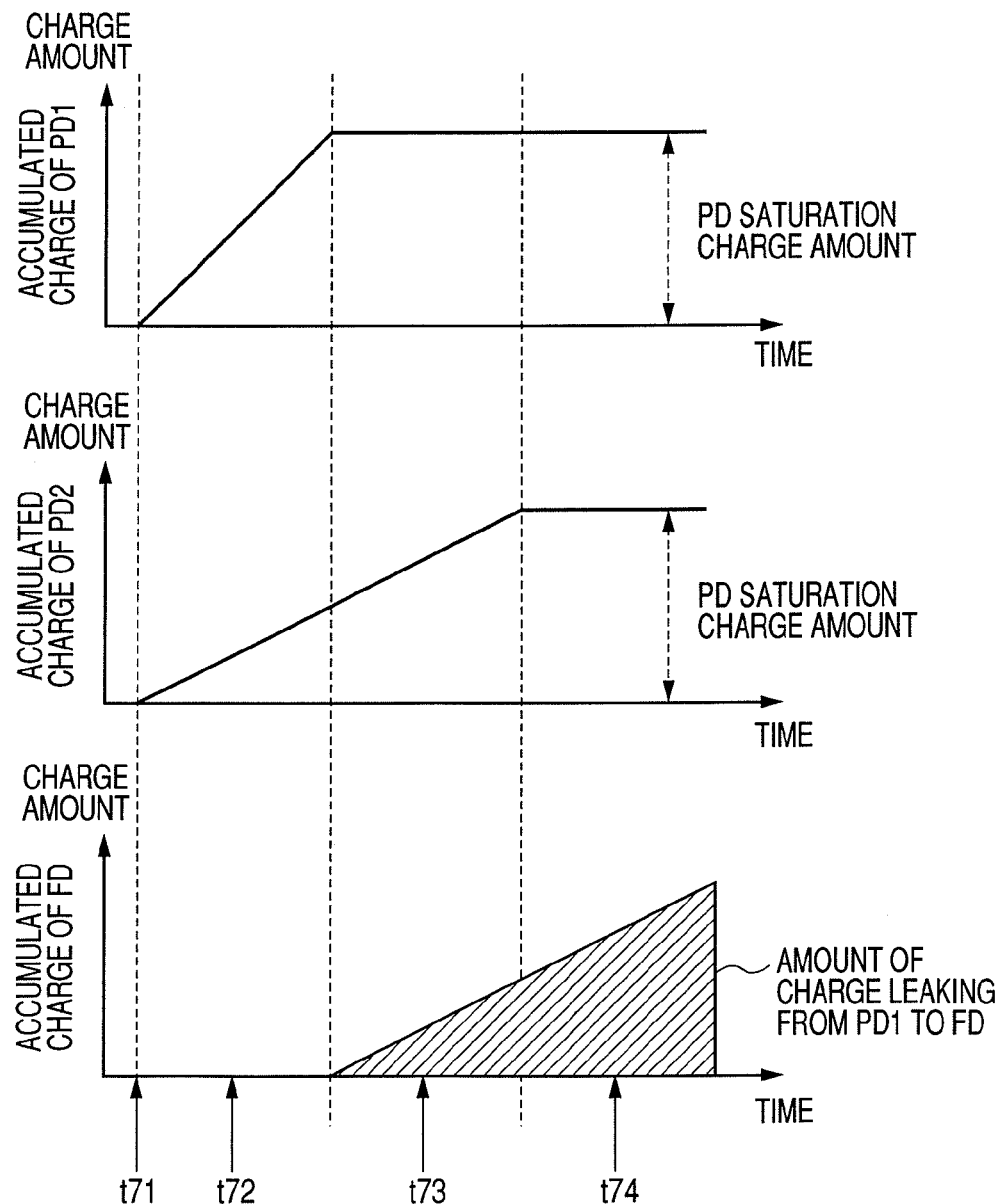
FIG. 4 is a figure describing a relation between accumulation time and a signal amount of an image pickup device according to the exemplary embodiment of the present invention.

A state of charges in the pixels sharing the FD is described with reference to FIGS. 3A to 3D and FIG. 4. FIGS. 3A to 3D are figures in which the upper part illustrates a cross-sectional constitution of each unit, and the lower part illustrates the potential distribution in the each unit. FIG. 4 is a figure illustrating a relation between an accumulated charge amount and an exposure time of each unit. In FIG. 4, the horizontal axis represents time and the vertical axis represents the charge amount. FIG. 3A corresponds to a state of the pixels at time point t71 in FIG. 4. FIG. 3B corresponds to a state of the pixels at time point t72 in FIG. 4. FIG. 3C corresponds to a state of the pixels at time point t73 in FIG. 4. FIG. 3D corresponds to a state of the pixels at time point t74 in FIG. 4. Further, in FIG. 4, there are respectively illustrated a relation between the accumulated charge amount of the PD1 and the exposure time, a relation between the accumulated charge amount of the PD2 and the exposure time, and a relation between the accumulated charge amount of the FD and the exposure time. Here, it is assumed that the PD1 is a pixel having a color filter more sensitive as compared with the PD2.

At time point t71 (corresponding to FIG. 3A), the PD1, the PD2 and the FD are reset, and signal charges start to be accumulated.

At time point t72 (corresponding to FIG. 3B), signal charges are accumulated in the PD1 and the PD2.

At time point t73 (corresponding to FIG. 3C), the accumulated charge amount of the PD1 exceeds a saturation charge amount. In the PD1, a potential barrier on the side of the transfer switch TX1 is lowest, so that signal charges generated in the PD1 start to leak into the FD. Referring to the potential distribution illustrated on the lower side in FIG. 3C, the potential barrier of semiconductor area (p-type semiconductor) on the left-hand side of the PD1 is sufficiently high, so that such potential distribution can be easily obtained unless a φTX1 of a large negative potential is applied to the gate electrode of the TX1.

At time point t74 (corresponding to FIG. 3D), the accumulated charge amount exceeds the saturation charge amount in the PD1 and the PD2. At this time, in the PD2, a potential barrier on the side of an overflow drain (OFD) is lower than the potential barrier on the side of the transfer switch TX2. Thereby, excess charges accumulated in the PD2 and exceeding the saturation charge amount start to leak into the OFD but not into the FD. When it is assumed that the constitution of the semiconductor area (channel) between the FD and the PD2 is substantially the same as the constitution of the semiconductor area between the OFD and the PD2, such potential distribution can be obtained by applying a φTX2 of a negative potential to the gate electrode of the TX2. This is because the potential below the transfer switch TX2 is lowered and the potential barrier below the transfer switch TX2 is raised, by applying the negative potential to the gate electrode of the TX2. In this way, at time point t74, the excess charges accumulated in the PD1 and exceeding the saturation charge amount start to leak into the FD. The excess charges accumulated in PD2 and exceeding the saturation charge amount start to leak into the OFD but not into the FD.

Figure 5A:
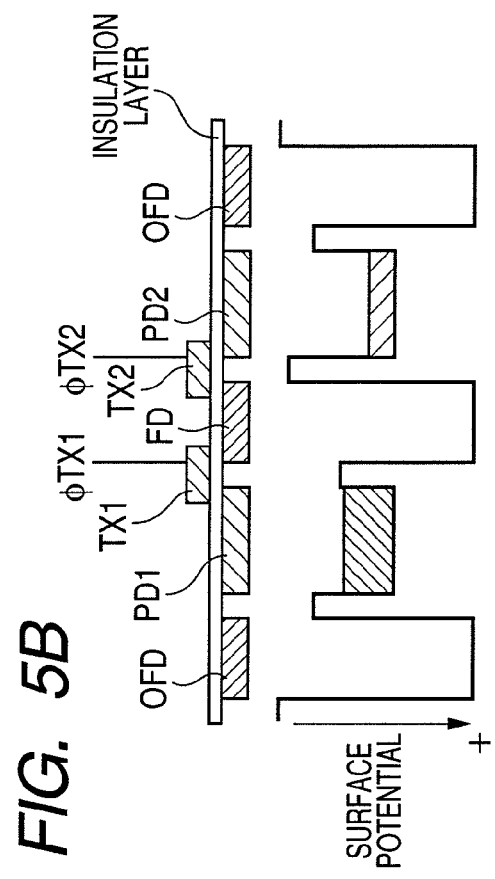
FIGS. 5A, 5B, 5C and 5D are figures illustrating a positional relation between photodiodes and an FD, and their potentials according to an exemplary embodiment of the present invention.
Figure 5B:
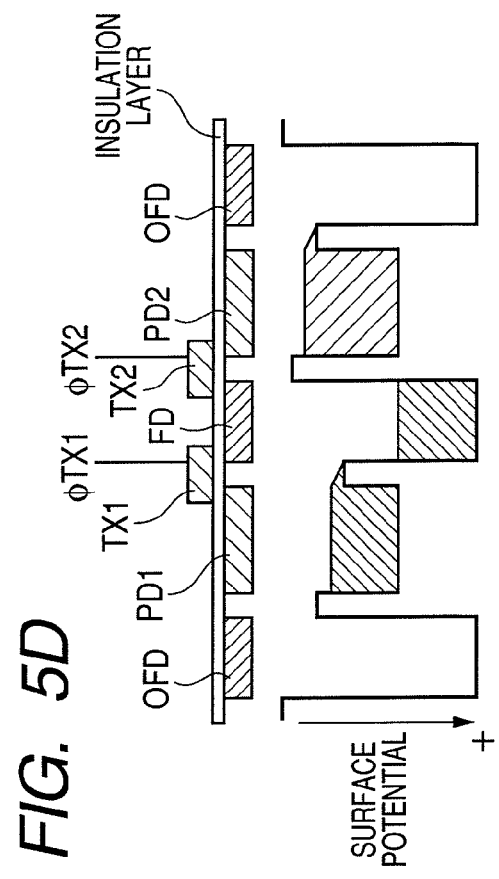
Figure 5C:
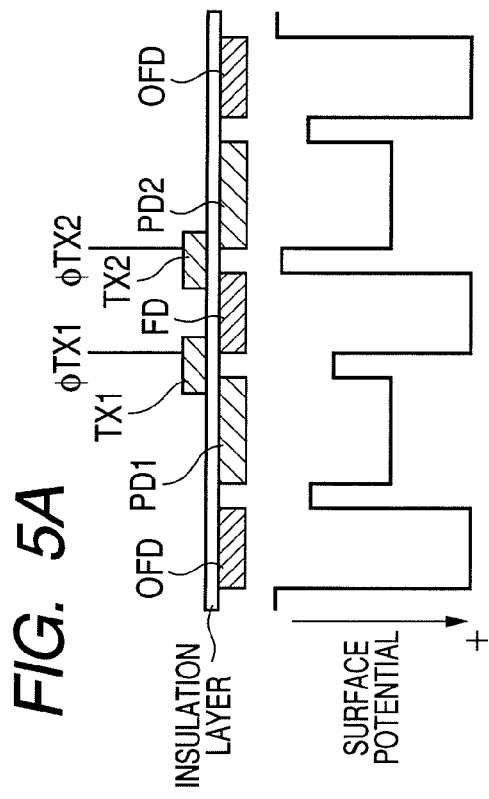
Figure 5D:
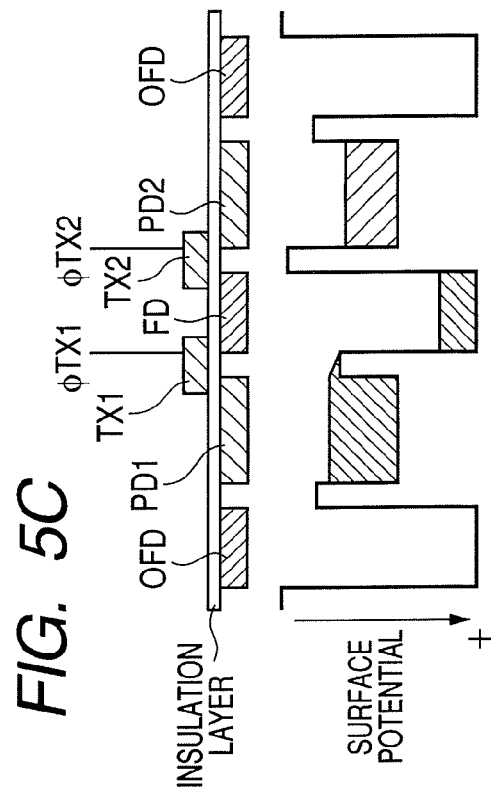

Next, with reference to FIG. 4 and FIGS. 5A to 5D, there are described states of charges in the pixels in which both the PD1 and the PD2 are provided with the OFD. FIGS. 5A to 5D are figures in which the upper part illustrates a cross-sectional constitution of each unit, and the lower part illustrates the potential distribution in the each unit. FIG. 5A corresponds to a state of the pixels at time point t71. FIG. 5B corresponds to a state of the pixels at time point t72. FIG. 5C corresponds to a state of the pixels at time point t73. FIG. 5D corresponds to a state of the pixels at time point t74.

At time point t71 (corresponding to FIG. 5A), the PD1, the PD2 and the FD are reset and signal charges start to be accumulated.

At time point t72 (corresponding to FIG. 5B), signal charges are accumulated in the PD1 and the PD2.

At time point t73 (corresponding to FIG. 5C), the accumulated charge amount of the PD1 exceeds the saturation charge amount. At this time, in the PD1, the potential barrier on the side of the transfer switch TX1 is lower than the potential barrier on the side of the OFD. Thereby, the excess charges accumulated in the PD1 and exceeding the saturation charge amount start to leak into the FD but not into the OFD. When it is assumed that the constitution of the semiconductor area (channel) between the OFD and the PD1 is substantially the same as the constitution of the semiconductor area between the FD and the PD1, such potential distribution can be obtained by applying the φTX1 of a positive potential to the gate electrode of the TX1. This is because the potential below the transfer switch TX1 is raised and the potential barrier below the transfer switch TX1 is lowered, by applying the positive potential to the gate electrode of TX1. Note that depending upon the constitution of the semiconductor area (channel) between the OFD and the PD1, it is also possible to obtain the potential distribution as illustrated in FIG. 5C by applying the φTX1 of a zero potential or a low negative potential to the gate electrode of the TX1. In this way, at time point t73, the signal charges generated in the PD1 starts to leak into the FD but not into the OFD.

At time point t74 (corresponding to FIG. 5D), the accumulated charge amount exceeds the saturation charge amount in the PD1 and the PD2. At this time, in the PD2, the potential barrier on the side of the OFD is lower than the potential barrier on the side of the transfer switch TX2. Thereby, the excess charges accumulated in the PD2 and exceeding the saturation charge amount start to leak into the OFD but not into the FD. When it is assumed that the constitution of the semiconductor area (channel) between the FD and the PD2 is substantially the same as the constitution of the semiconductor area between the OFD and the PD2, such potential distribution can be obtained by applying the φTX2 of a negative potential to the gate electrode of the TX2. This is because the potential below the transfer switch TX2 is lowered and the potential barrier below the transfer switch TX2 is raised, by applying the negative potential to the gate electrode of the TX2. In this way, at time point t74, the excess charges accumulated in the PD1 and exceeding the saturation charge amount start to leak into the FD. The excess charges accumulated in PD2 and exceeding the saturation charge amount start to leak into the OFD but not into the FD.

In this way, even when the OFD is arranged only in the PD2 as illustrated in FIGS. 3A to 3D, and even when the OFD is arranged in both the PD1 and the PD2 as illustrated in FIGS. 5A to 5D and FIGS. 6A to 6D, the excess charges in the PD1 start to leak into the FD, and the excess charges in PD2 start to leak into the OFD.

The charges which have leaked into the FD are read out and then added to the signals of the PD1, thereby enabling the expansion of the dynamic range by the same method as that for the conventional constitution in which the signal reading circuit is provided for one pixel.

For the purpose of description, two PDs share an FD, but the present invention is not limited to this. The number of PDs may be, for example, three or more. When two PDs shares an FD, the dynamic range can be more effectively expanded by the method as will be described below.

In the structure illustrated in FIGS. 5A to 5D, whether the charges are discharged to the OFD side or the FD side is determined by the voltages of the φTX1 and the φTX2 applied to the TX1 and the TX2, respectively. However, a constitution as illustrated in FIGS. 6A to 6D may also be adopted.

FIGS. 6A to 6D illustrate a constitution having charge discharge switches in addition to the transfer switches. FIG. 6A corresponds to a state of pixels at time point t71 in FIG. 4. FIG. 6B corresponds to a state of the pixels at the time point t72 in FIG. 4. FIG. 6C corresponds to a state of the pixels at the time point t73 in FIG. 4. FIG. 6D corresponds to a state of the pixels at the time point t74 in FIG. 4.

At time point t71 (corresponding to FIG. 6A), the PD1, the PD2 and the FD are reset, and signal charges start to be accumulated.

At time point t72 (corresponding to FIG. 6B), signal charges are accumulated in the PD1 and the PD2.

At time point t73 (corresponding to FIG. 6C), the accumulated charge amount of the PD1 exceeds the saturation charge amount. In the PD1, the potential barrier on the side of the transfer switch TX1 is lower than the potential barrier on the side of a charge discharge switch TOFD1. Thereby, the excess charges accumulated in the PD1 and exceeding the saturation charge amount start to leak into the FD but not into the OFD. When it is assumed that the constitution of the semiconductor area (channel) between the FD and the PD1 is substantially the same as the constitution of the semiconductor area between the OFD and the PD1, such potential distribution can be obtained by making the potential of the φTX1 higher than the potential of a φTOFD1. This is because when the potential of the φTX1 is made higher than the potential of the φTOFD1, the potential below the transfer switch TX1 becomes relatively higher than the potential below the charge discharge switch TOFD1, and thereby the potential barrier below the transfer switch TX1 becomes relatively lower than the potential barrier below the charge discharge switch TOFD1.

At time point t74 (corresponding to FIG. 6D), the accumulated charge amount exceeds the saturation charge amount in both the PD1 and the PD2. At this time, in the PD2, the potential barrier on the side of a charge discharge switch TOFD2 is lower than the potential barrier on the side of the transfer switch TX2. Thereby, the excess charges accumulated in the PD2 and exceeding the saturation charge amount start to leak into the OFD but not into the FD. When it is assumed that the constitution of the semiconductor area (channel) between the FD and the PD2 is substantially the same as the constitution of the semiconductor area between the OFD and the PD2, such potential distribution can be obtained by making the potential of the φTX2 lower than the potential of a φTOFD2. This is because when the potential of the φTX2 is made lower than the potential of the φTOFD2, the potential below the transfer switch TX2 becomes relatively lower than the potential below the charge discharge switch TOFD2, and thereby the potential barrier below the transfer switch TX2 becomes relatively higher than the potential barrier below the charge discharge switch TOFD2. In this way, at time point t74, the excess charges accumulated in the PD1 and exceeding the saturation charge amount start to leak into the FD. The excess charges accumulated in PD2 and exceeding the saturation charge amount start to leak into the OFD but not into the FD.

Figure 7:
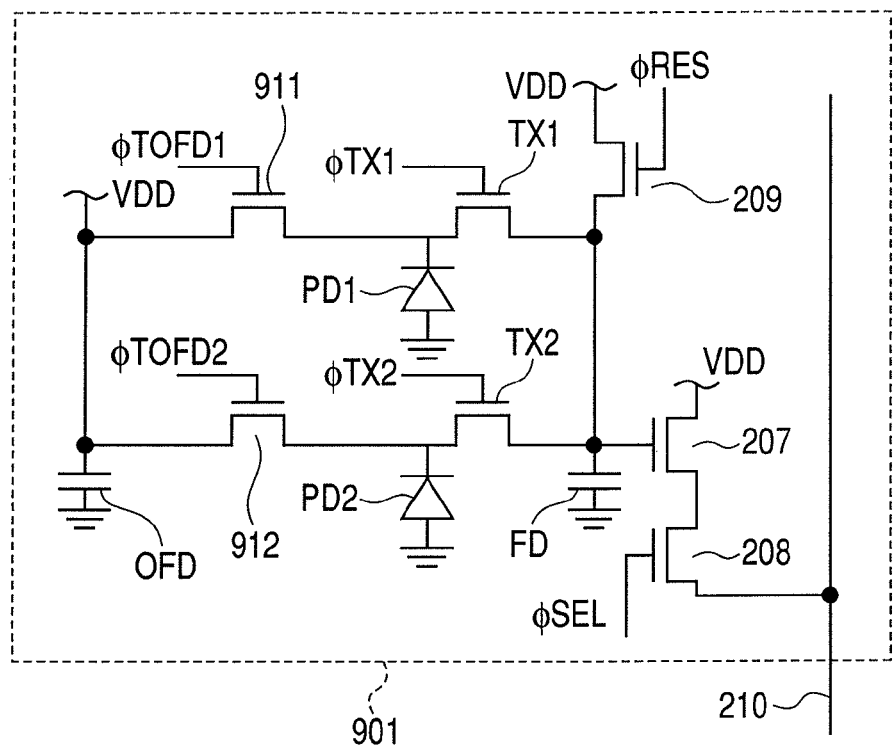
FIG. 7 is a figure illustrating a circuit constitution relating to a read operation in two pixels sharing a signal reading circuit.

FIG. 7 is a figure illustrating a detail of the pixel illustrated in FIGS. 6A to 6D. The same units as those in FIG. 2 are denoted by the same reference numerals and characters. The overflow drain OFD discharges excess charges and is connected to the PD1 and the PD2 via the charge discharge switches TOFD1 and TOFD2, respectively. The charge discharge switches TOFD1 and TOFD2 are driven by charge discharge pulses φTOFD1 and φTOFD2, respectively. Then, the excess charges in the PD1 and the PD2 are distributed to one of the OFD and the FD by the voltage values of the φTX1, the φTX2, the φTOFD1 and the φTOFD2.

Figure 8:
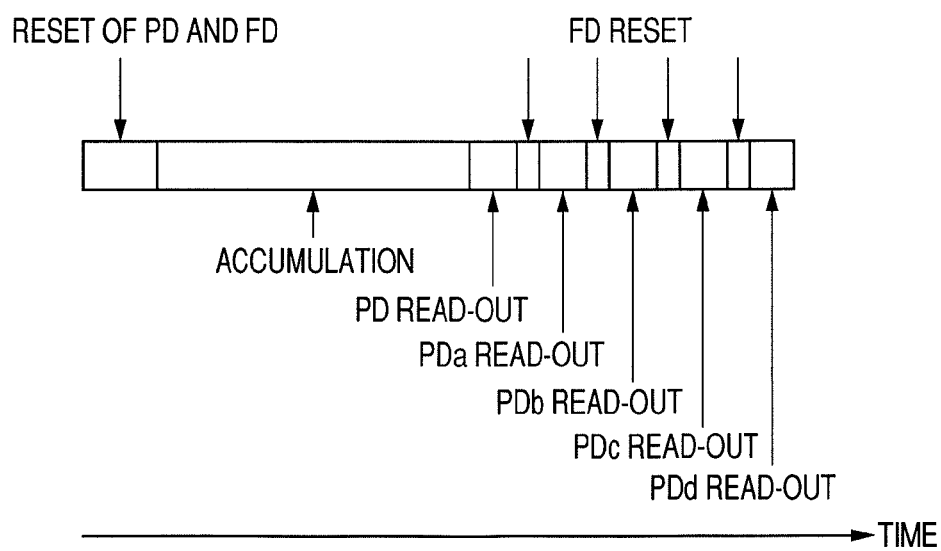
FIG. 8 is a figure describing a temporal relation in driving the image pickup device.

Next, a temporal relation between a read operation in the FD and a read operation in the PD is described with reference to FIG. 8 which illustrates a temporal relation in driving the image pickup device. In FIG. 8, the horizontal axis represents time. For the purpose of description, the number of PDs sharing the FD is assumed to be four. First, the image pickup device resets the PD and the FD prior to photographing operation. Then, the image pickup device starts to accumulate charges so that signal charges are generated in the PD. The signal charges in the PD operating in the above described mode of PD1 are discharged to the FD, when exceeding the saturation charge amount. The signal charges in the PD operating in the above described mode of PD2 are discharged to the OFD, when exceeding the saturation charge amount. Which of PDa, PDb, PDc and PDd is set to the mode of PD1 is determined by a color decision unit as will be described below. The PDs other than the mode of PD1 operate as the mode of PD2. When the charge accumulation is ended, the signal of the FD is read out. Then, the FD is reset once, and the PDa set as the first PD is read out. Then, the FD is reset again, and the PDb set as the second PD is read out. This operation is repeated until the PDd set as the fourth PD is read. The signal of the FD is added to the read signal of one of PDa to PDd which is operated in the mode of the PD1, by a color decision operation unit as will be described below, so that the resultant signal is output as an image in which the saturation of one of the four PDs is expanded.

Figure 9A:
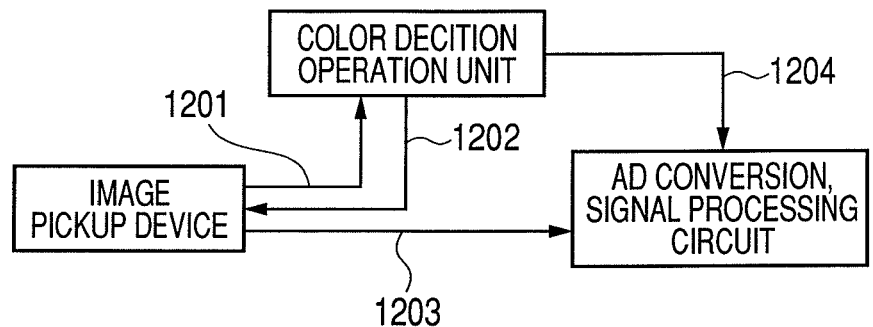
FIGS. 9A and 9B are figures describing an image pickup apparatus including color decision unit.

It is determined by the color decision unit which one of the PDs respectively provided with color filters performs the operation of PD1 in which the signal amount is large. The way of determination is described with reference to FIGS. 9A and 9B. As illustrated by 1201 in FIG. 9A, the color decision unit performs a preliminary photographing operation in an image pickup device used for main photographing just before a photographer performs the main photographing operation. The picked up image is sent to a color decision operation unit. The color decision operation unit determines a color in which the signal amount is largest, based on an average value of a specific region and the like, and makes the PD having the color filter of the color operate in the above described mode of PD1. Then, in order to operate the remaining PDs in the above described mode of PD2, as illustrated by 1202 in FIG. 9A, the color decision operation unit sends to the image pickup device or an image pickup device driving unit (not shown) the information on the PD to be operated in the mode of PD1 or the information to be operated in the mode of PD2. The image pickup device or the image pickup device driving unit (not shown) determines a drive pattern and performs the main photographing operation based on the information sent from the color decision operation unit. A state where the signal of the FD and the signals of the plurality of PDs are output as described above in the main photographing operation is illustrated by 1203 in FIG. 9A. As for the output signals, as illustrated by 1204 in FIG. 9A, the signal of the FD is added by a signal processing circuit to the signal of the PD operated in the mode of PD1 among the signals of the plurality of PDs, based on the information sent from the color decision operation unit. The signals of the other PDs are set as the signal of the PD operated in the mode of PD2 and processed without being added with the signal of the FD.

Figure 9B:
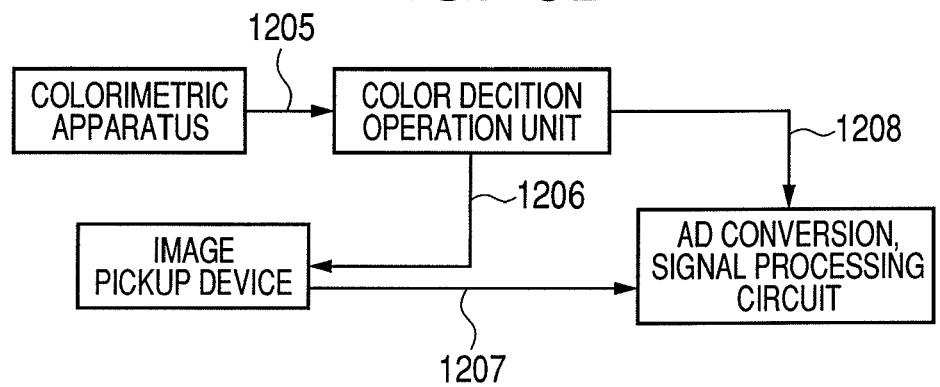

Further, as illustrated in FIG. 9B, in addition to the image pickup device used for the main photographing operation, the image pickup apparatus includes an apparatus for color determination separately, and estimates which one of PDs respectively provided with color filters generates signal amount which is most increased in an image to be photographed, based on color information from the apparatus for color determination. Then, the image pickup apparatus enables the estimated PD to operate in the mode of PD1. In this case, the exchange of data (1206 to 1208) except 1205 in FIG. 9B is performed similarly to that in FIG. 9A.

Figure 10A:
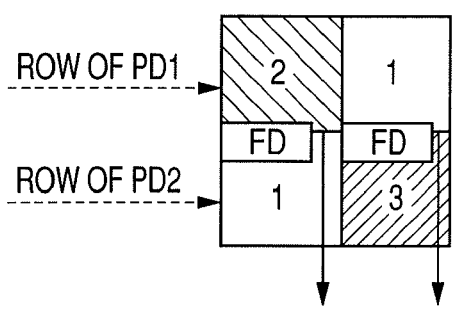
FIGS. 10A and 10B are figures describing a positional relation between color filters of the image pickup device according to the exemplary embodiment of the present invention.
Figure 10B:
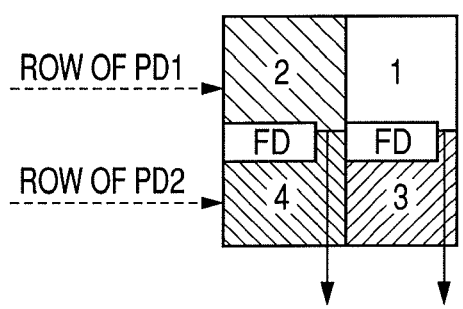

The pixels each of which has a color filter are regularly arranged in the vertical direction and the horizontal direction, as illustrated in FIGS. 10A and 10B. FIG. 10A illustrates an arrangement in which three kinds of color filters are used, and FIG. 10B illustrates an arrangement in which four kinds of color filters are used. Here, two pixels sharing the FD are assumed to be vertically arranged. As illustrated in FIG. 10B, when four kinds of color filters are used, a color filter having a highest sensitivity is arranged as the above described PD1. Since two pixels sharing the FD are vertically arranged side by side, a pixel arranged horizontally adjacent to the PD1 is also the PD1. Thereby, it is possible to expand the dynamic range in the two colors. In the case as illustrated in FIG. 10B, from a viewpoint of expanding the dynamic range, it is more preferred to arrange two colors of color filters having a high sensitivity in a row in which the dynamic range is to be expanded.

When three kinds of color filters as illustrated in FIG. 10A are used, two color filters having a highest sensitivity are often provided in the case of normal photographing. Thereby, it is possible to increase the charge amount handled by the PDs of colors other than that of the PD provided with the color filter having a lowest sensitivity, by setting the color filter having the lowest sensitivity in the row of PD2. As a result, it is possible to obtain an image in which the dynamic range of the pixels other than the pixel provided with the color filter having the lowest sensitivity is expanded.

Further, when the pixel provided with the color filter having the lowest sensitivity is saturated, it may be adapted such that the pixels at the periphery of the saturated pixel are also regarded to be saturated, and the signals are changed by signal processing.

Figure 11:
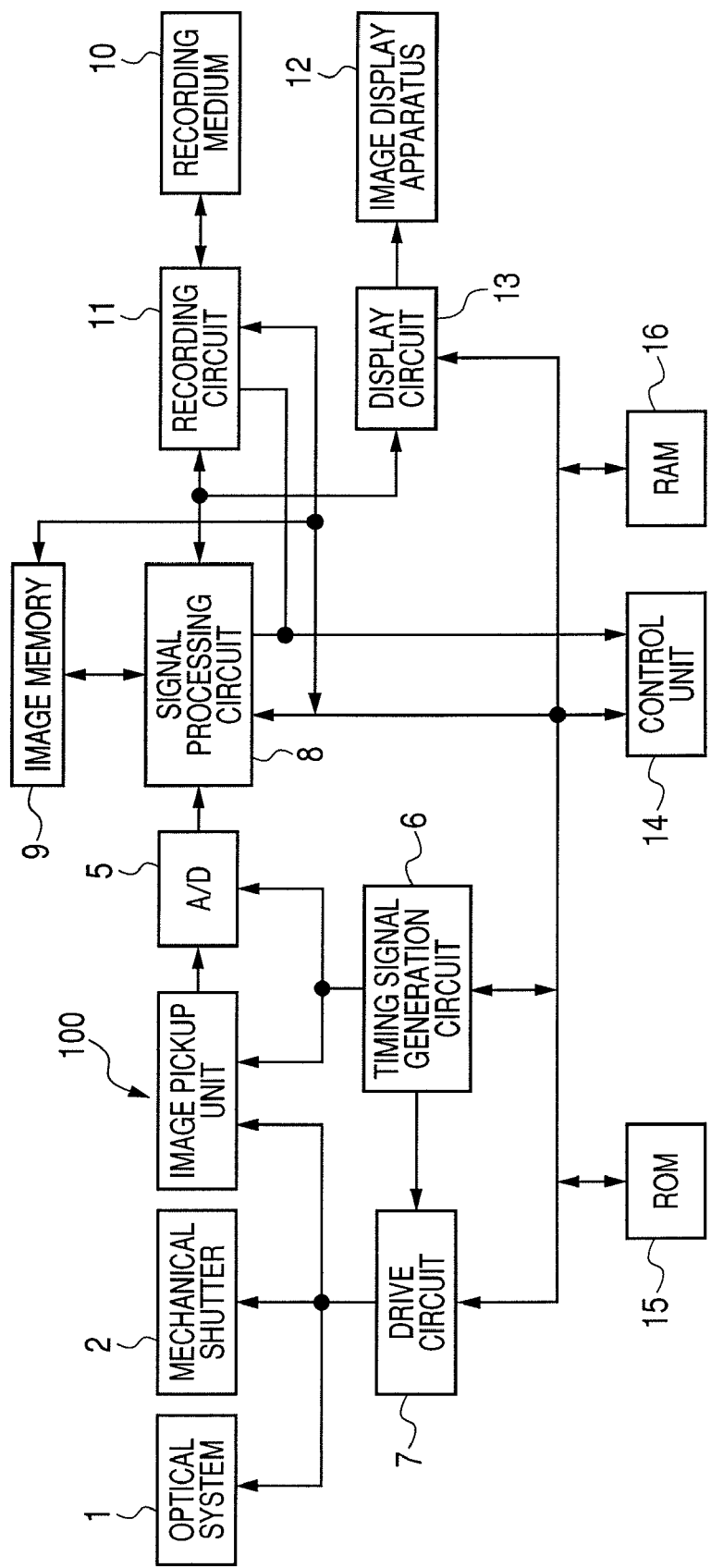
FIG. 11 is a constitution diagram of a digital camera to which the image pickup device according to the exemplary embodiment of the present invention is applied.

Next, there is described an image pickup apparatus in which the image pickup unit 100 according to the present embodiment is incorporated. FIG. 11 is a figure illustrating the image pickup apparatus according to the present embodiment.

A light beam is made incident on the image pickup unit 100 through an optical system 1 having an iris mechanism and lenses. A mechanical shutter 2 is arranged between the optical system 1 and the image pickup unit 100 or in the optical system 1. The optical system 1, the mechanical shutter 2, and the image pickup unit 100 are driven by a drive circuit 7. An A/D converter 5 converts an analog signal processed in the CDS circuit (CDS circuit 103 in FIG. 1) in the image pickup unit 100 to a digital signal. A timing signal generation circuit 6 generates a timing signal supplied to the image pickup unit 100, the CDS circuit 103, and the A/D converter 5. A signal processing circuit 8 performs various signal processings to the A/D converted image data in addition to the above described signal processing. An image memory 9 is used to temporarily store the digital image signal being subjected to the signal processing and to store the image data which is the digital image signal subjected to the signal processing. A recording circuit 11 records the image data subjected to the signal processing in a recording medium 10. A display circuit 13 supplies the image data subjected to the signal processing to an image display apparatus 12, and to make the image display apparatus 12 display the image data.

A ROM 15 such as a nonvolatile memory stores a control program, control data such as a parameter and a table used in executing the control program, and correction data such as a defect address. The program, the control data and the correction data which are stored in the ROM 15 are transferred to a RAM 16, so as to be used by a control unit 14 which performs control of the whole image pickup apparatus.

Prior to photographing operation, at a time when the control unit 14 starts to be operated, such as when the power source of the image pickup apparatus is turned on, a necessary program, control data and correction data are transferred from the ROM 15 to the RAM 16. According to a control signal sent from the control unit 14, the optical system 1 drives the iris and the lens, to enable an object image set to proper brightness to be formed on the image pickup device 100. Next, according to the control signal sent from the control unit 14, the mechanical shutter 2 is driven so as to shade the image pickup unit 100 in correspondence with the operation of the image pickup device. The image pickup unit 100, which is driven by a driving pulse generated in the drive circuit 7 based on an operation pulse generated by the timing signal generation circuit 6 controlled by the control unit 14, converts the object image to an electric signal by photoelectric conversion, and outputs the electric signal as an analog image signal. The analog image signal output from the image pickup unit 100, whose clock synchronous noise is removed in the CDS circuit 103 based on the operation pulse generated by the timing signal generation circuit 6 controlled by the control unit 14, is converted to a digital image signal by the A/D converter 5. Next, in the signal processing circuit 8 controlled by the control unit 14, image processing such as color conversion, white balance and gamma correction, resolution conversion processing, image compression processing, and the like are performed to the digital image signal. The image data subjected to the signal processing in the signal processing circuit 8, and the image data stored in the image memory 9 are converted in the recording circuit 11 to data (for example, file system data having a hierarchical structure) suitable for the image recording medium 10. Then, the data is stored in the recording medium 10 or subjected to the resolution conversion processing in the signal processing circuit 8. The data subjected to the resolution conversion processing is thereafter converted in the display circuit 13 to a signal (for example, analog signal of the NTSC system or the like) suitable for the image display apparatus 12, so as to be displayed in the image display apparatus 12.

Here, in the signal processing circuit 8, the digital signal may not be subjected to the signal processing but may be output as it is to the image memory 9 or the recording circuit 11. Further, when there is a request from the control unit 14, the signal processing circuit 8 outputs to the control unit 14 information on the digital image signal and the image data which are generated in the process of the signal processing. The information includes, for example, information on the spatial frequency of the image, the average value of a specified region, the amount of data of a compressed image and the like, or information extracted from these. Further, when there is a request from the control unit 14, the recording circuit 11 outputs to the control unit 14 information on a type, a free space and the like of the image recording medium 10.

Figure 12:
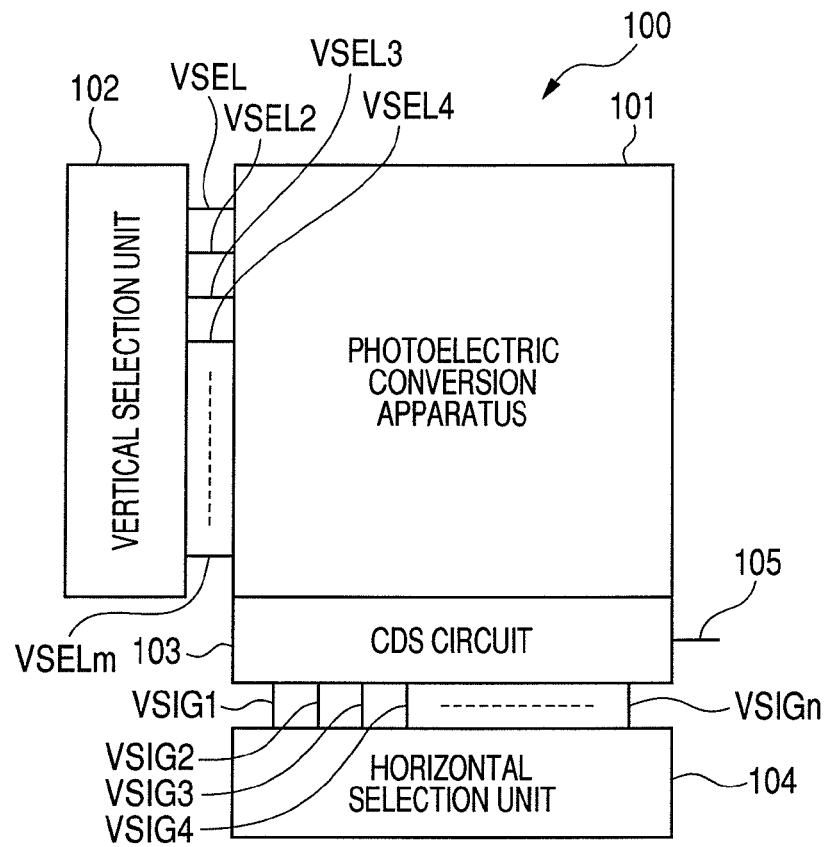
FIG. 12 is a figure illustrating a constitution of the image pickup unit according to the exemplary embodiment of the present invention.

FIG. 12 is a figure illustrating a constitution of an image pickup unit 100 according to a second embodiment of the present invention. First, a plurality of pixels is arranged in the vertical direction and the horizontal direction in a photoelectric conversion apparatus 101. A vertical selection unit 102 outputs a control pulse for reading electric signals from pixels for each of row selection lines VSEL1 to VSELm. An electric signal of the respective pixels selected by the row selection lines VSEL1 to VSELm is selected by a control pulse of the column selection lines VSIG1 to VSIGm applied by the horizontal selection unit 104. The output signal of the pixel selected by the control pulse of the column selection lines VSIG1 to VSIGm, is subjected to the CDS (Correlated Double Sampling) processing by the CDS circuit 103. The signal processed in the CDS circuit 103 is sequentially output from an output line 105.

Figure 13:
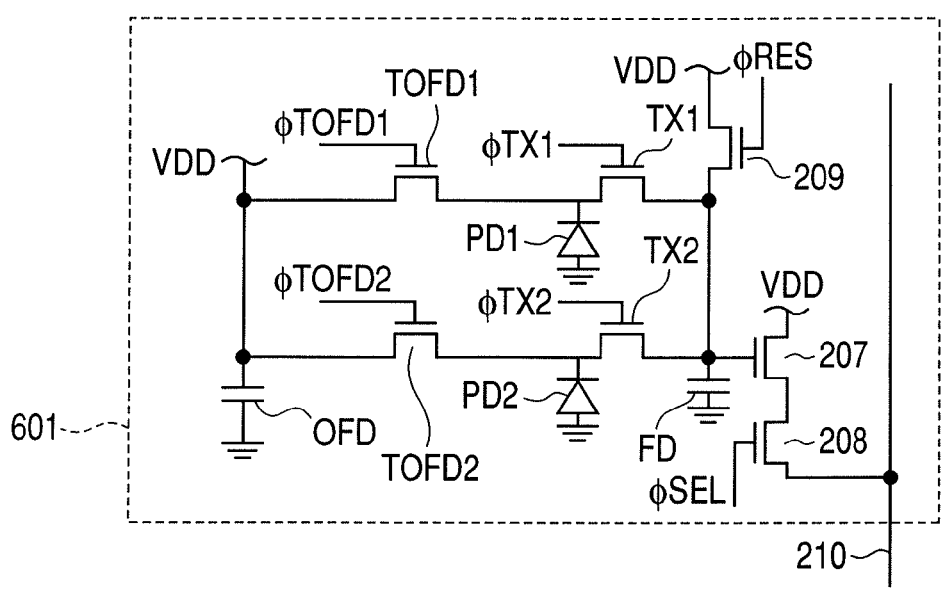
FIG. 13 is a figure illustrating a detail of the pixel in the photoelectric conversion apparatus in FIG. 1.

FIG. 13 illustrates a detail of the pixel in the photoelectric conversion apparatus 101 in FIG. 12. Reference numeral 601 denotes a pixel area (pixel structure), wherein two pixels sharing a signal reading circuit are arranged. Photoelectric conversion devices PD1 and PD2 convert light into electric charges. Transfer switches TX1 and TX2 are driven by transfer pulses $\phi$TX1 and $\phi$TX2, respectively, and transfer the charges generated in the PD1 and the PD2 to an FD, respectively.

The FD is an accumulating unit which temporarily accumulates the charges. An amplifying MOS amplifier 207 functions as a source follower. A selection switch 208 selects a pixel by a vertical selection pulse $\phi$SEL. A reset switch 209 removes the charges accumulated in the FD by a reset pulse $\phi$RES. An FDA is constituted of the FD, the amplifying MOS amplifier 207, and a constant current source (not shown) connected to the signal reading circuit. The signal charge of the pixel selected by the selection switch 208 is converted to a voltage so as to be output to the CDS circuit 103 in FIG. 12 via a read-out output line 210.

An overflow drain OFD discharges excess charges. The OFD is connected to the PD1 and the PD2 via charge discharge switches TOFD1 and TOFD2, respectively. The charge discharge switches TOFD1 and TOFD2 are driven by charge discharge pulses $\phi$TOFD1 and $\phi$TOFD2, respectively. The charge discharge threshold values of the charge discharge switches TOFD1 and TOFD2 are determined by the voltage values of the charge discharge pulses $\phi$TOFD1 and $\phi$TOFD2, respectively. In the exemplary embodiment according to the present invention, as will be described below, a common voltage is supplied to a part of the wirings to which the transfer pulses $\phi$TX1 and $\phi$TX2 and the charge discharge pulses $\phi$TOFD1 and $\phi$TOFD2 are applied, so that the voltages applied to the wirings are changed during a period when the signal charges are accumulated in the PD1 and the PD2. Thereby, the excess charges exceeding the saturation charge amount of the PD1 and the PD2 can be accumulated in the FD and the OFD, respectively.

Figure 14A:
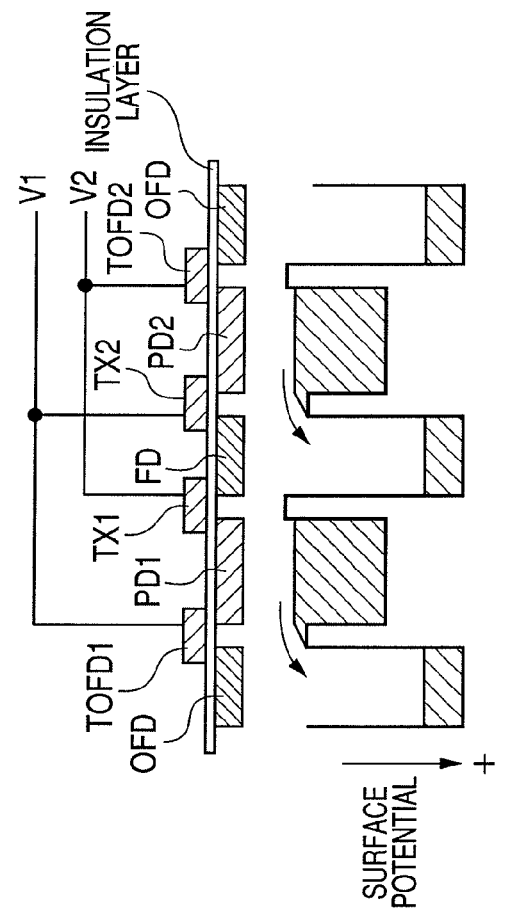
FIGS. 14A and 14B are figures describing voltages applied to the charge discharge switch and the transfer switch, and the potential distribution of respective units.
Figure 14B:
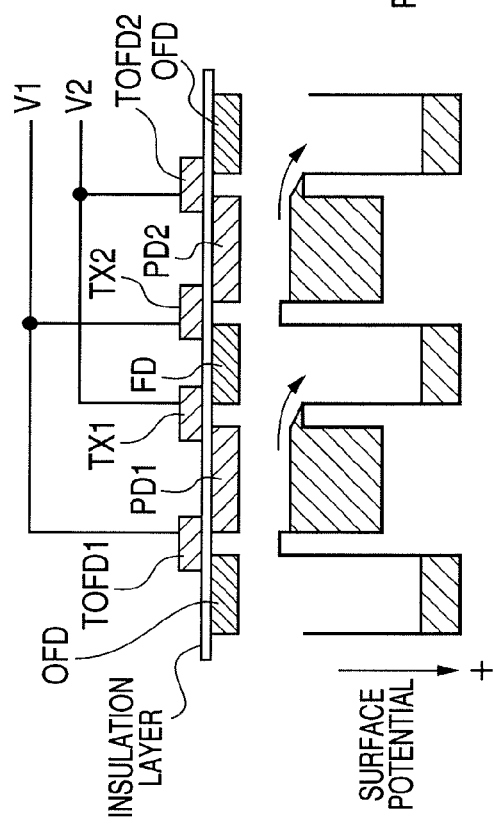

FIGS. 14A and 14B are figures for describing the voltages applied to the charge discharge switches TOFD1 and TOFD2 and the transfer switches TX1 and TX2, and the potential distribution of the respective units. The wiring connected to the TOFD1 and the wiring connected to the transfer switch TX2 are connected in common, and a common voltage V1 is applied to the wirings. Further, the wiring connected to the gate of the TOFD2 and the wiring connected to the gate of the transfer switch TX1 are connected in common, and a common voltage V2 is applied to the wirings. Note that in FIGS. 14A and 14B, for convenience of illustration, two OFDs are illustrated, but as shown in FIG. 13, one OFD is actually provided.

FIG. 14A illustrates a case where V2 is set to a voltage higher than V1. In this case, the potential barriers of the charge discharge switch TOFD1 and the transfer switch TX2 become higher than the potential barriers of the transfer switch TX1 and the charge discharge switch TOFD2. The potential barrier in this case represents the potential barrier seen from an electron. Therefore, the excess charges exceeding the saturation charge amount of the PD1 exceed the potential barrier of the transfer switch TX1 to flow into the FD. The excess charge exceeding the saturation charge amount of the PD2 exceeds the potential barrier of the charge discharge switch TOFD2 to be discharged into the OFD.

FIG. 14B illustrates the case where V1 is set to a voltage higher than V2. In this case, the potential barriers of the charge discharge switch TOFD1 and the transfer switch TX2 become lower than the potential barriers of the transfer switch TX1 and the charge discharge switch TOFD2. As a result, the excess charges exceeding the saturation charge amount of the PD1 exceed the potential barrier of charge discharge switch TOFD1 to be discharged to the OFD. Further, the excess charges exceeding the saturation charge amount of the PD2 exceed the potential barrier of transfer switch TX2 to flow into the FD.

In this way, it is possible to accumulate the excess charges of the PD1 and the PD2 are respectively distributed and accumulated in the FD and the OFD so that the excess charges of the PD1 and the PD2 exceeding the respective saturation charge amounts are not intermixed in the FD and the OFD.

Figure 15:
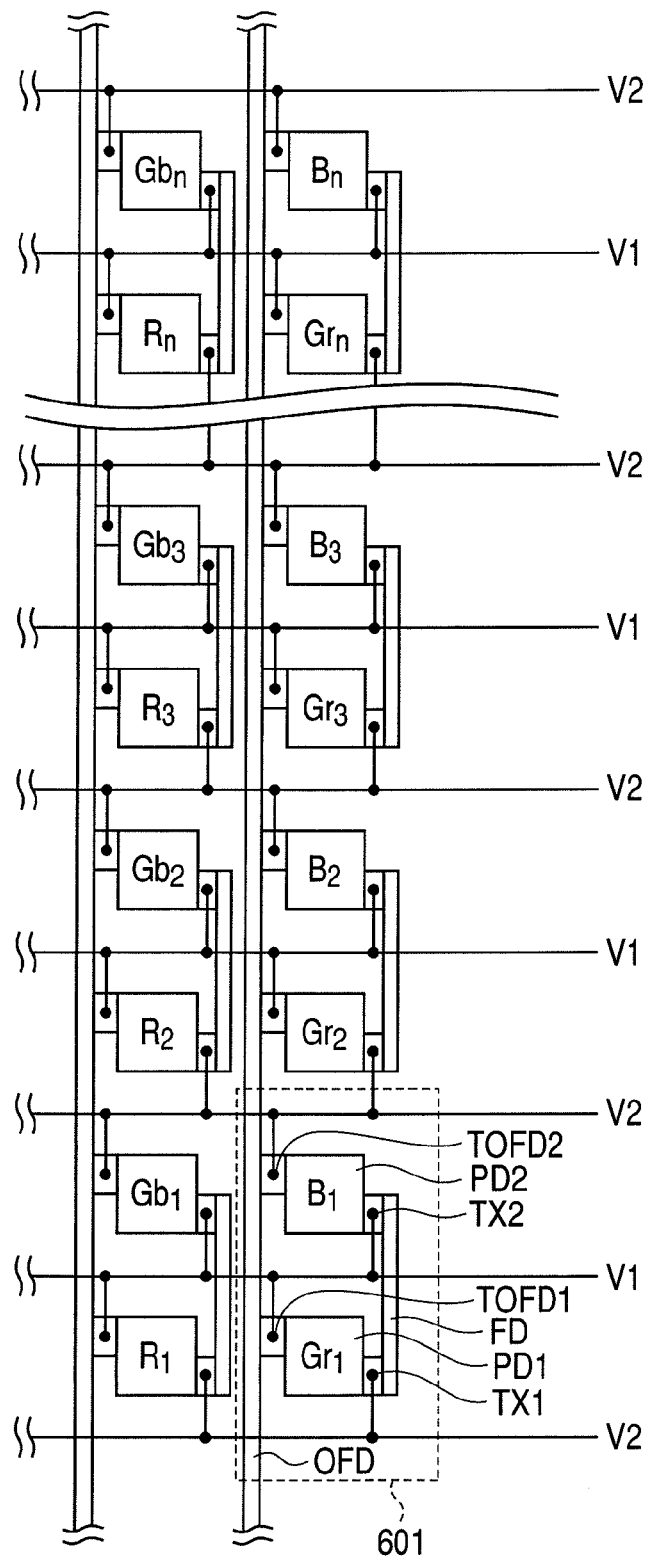
FIG. 15 is a figure describing in more detail commonalization of the wirings illustrated in FIG. 2 and FIGS. 3A to 3D.

FIG. 15 is a figure for describing in more detail the commonalization of the wirings as illustrated in FIG. 13 and FIGS. 14A and 14B. The same constitutions as those in FIG. 13 and FIGS. 14A and 14B are denoted by the same reference numeral and characters. In FIG. 15, the circuit subsequent to the FD is omitted for convenience of illustration. As illustrated in FIG. 15, four kinds of color filters R, Gr, Gb and B are laminated on the respective PDs. The color filters Gr and B are laminated on the PD1 and the PD2 arranged in the pixel area 601, respectively. The PD1 and the PD2 share one FD.

While the charges are accumulated in the PD1 and the PD2, the voltage V1 and the voltage V2 higher than V1 are applied. In this case, as illustrated in FIG. 14A, the excess charges exceeding the saturation charge amount of the PD1 (R1) are accumulated in the FD, and the excess charges exceeding the saturation charge amount of PD2 (Gb1) sharing the FD with the PD1 (R1) are discharged to the OFD. Similarly, the excess charges exceeding the saturation charge amount of PD1 (Gr1) are accumulated in the FD, and the excess charges exceeding the saturation charge amount of the PD2 (B1) sharing the FD with the PD1 (Gr1) are discharged to the OFD. Further, the excess charges exceeding the saturation charge amount of PD1 (R3) are accumulated in the FD, and the excess charges exceeding the saturation charge amount of the PD2 (Gb3) sharing the FD with the PD1 (R3) are discharged to the OFD. Similarly, the excess charges exceeding the saturation charge amount of the PD1 (Gr3) are accumulated in the FD, and the excess charges exceeding the saturation charge amount of the PD2 (B3) sharing the FD with the PD1 (Gr3) are discharged to the OFD.

Further, during the period when the charges are accumulated in the PD1 and the PD2, the voltage V1 and the voltage V2 lower than V1 may also be applied. In this case, as shown in FIG. 14B, the excess charges exceeding the saturation charge amount of the PD1 (R1) are discharged to the OFD, and the excess charges exceeding the saturation charge amount of the PD2 (Gb1) sharing the FD with the PD1 (R1) are accumulated in the FD. Similarly, the excess charges exceeding the saturation charge amount of the PD1 (Gr1) are discharged to the OFD, and the excess charges exceeding the saturation charge amount of the PD2 (B1) sharing the FD with the PD1 (Gr1) are accumulated in the FD. Further, the excess charges exceeding the saturation charge amount of the PD1 (R3) are discharged to the OFD, and the excess charges exceeding the saturation charge amount of the PD2 (Gb3) sharing the FD with the PD1 (R3) are accumulated in the FD.

Similarly, the excess charges exceeding the saturation charge amount of the PD1 (Gr3) are discharged to the OFD, and the excess charges exceeding the saturation charge amount of the PD2 (B3) sharing the FD with the PD1 (Gr3) are accumulated in the FD.

Therefore, according to the constitution as illustrated in FIG. 15, it is possible to acquire the excess charges exceeding the saturation charge amount of the PD corresponding to either of the two color filters, and to expand the dynamic range of the PD.

Figure 16:
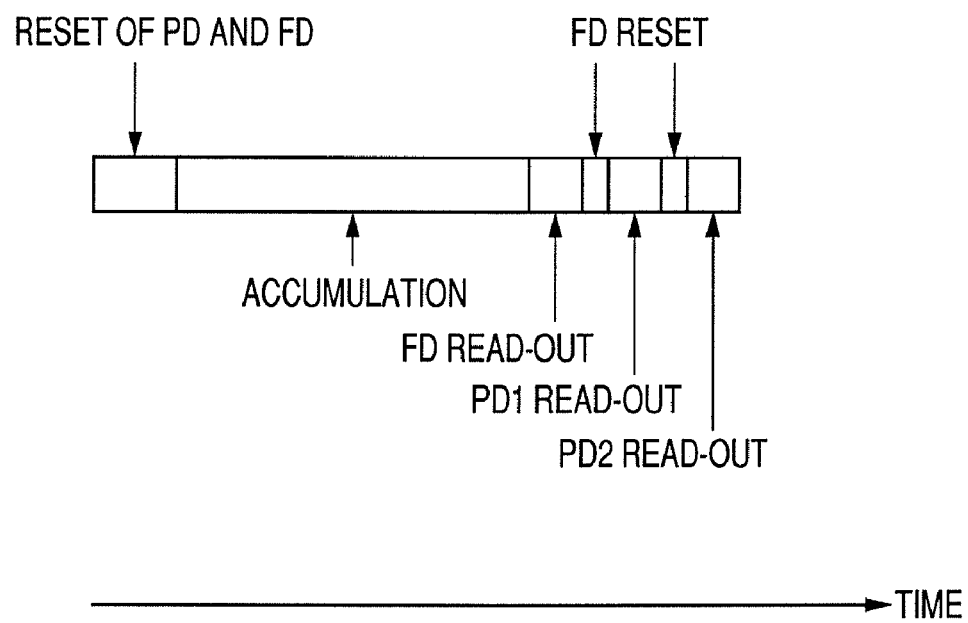
FIG. 16 is a figure illustrating a temporal relation in driving the image pickup device in relation to a temporal relation between a read operation of the FD and a read operation of the PD.

Next, there is described a temporal relation between the read operation of FD and the read operation of PD with reference to FIG. 16 which illustrates a temporal relation in driving the image pickup device.

In FIG. 16, the horizontal axis represents time. For the purposes of description, two PDs of the PD1 and the PD2, which share the FD, are assumed to be provided. First, prior to photographing operation, the photoelectric conversion apparatus 101 resets the PDs and the FD. Then, signal charges are generated in the PD1 and the PD2, and start to be accumulated in the PD1 and the PD2. As described above, when exceeding the saturation charge amount, the signal charges in the specified PD (here, PD1) are accumulated in the FD. When the accumulation of the signal charges is ended, the signal charges accumulated in the FD are read out first. Then, the FD is reset once, and the signal charges accumulated in the PD1 connected in common to the FD are read out. Then, the FD is reset again, and the signal charges accumulated in the PD2 are read out. This operation is repeated so as to acquire the signals for one screen. The signals accumulated in the FD and based on the excess charges exceeding the saturation charge amounts of the PD1 and the PD2 are subjected to a known interpolation processing and the like, and thereafter synthesized with the signals from the PD1 and the PD2. As a result, the image signals for one frame can be obtained.

Figure 17:
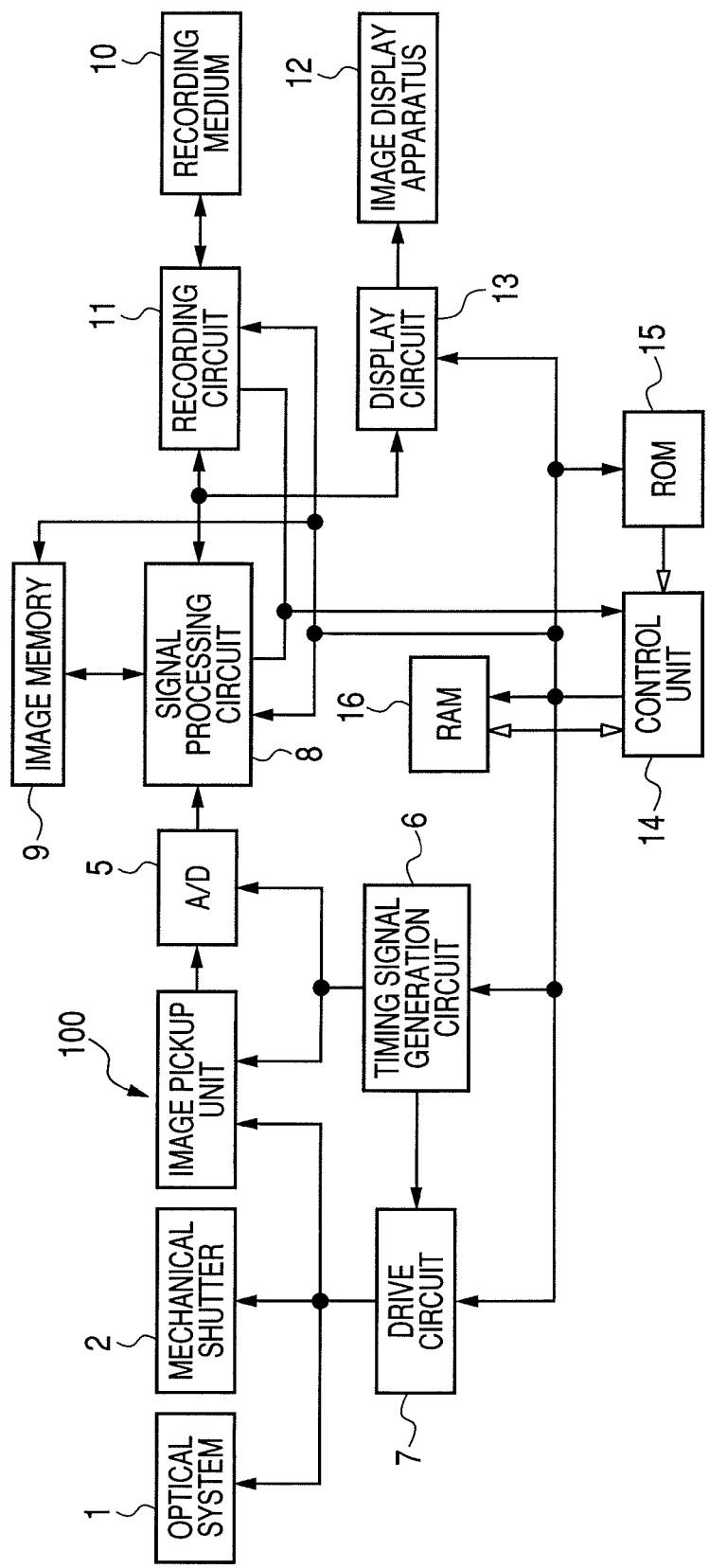
FIG. 17 is a figure illustrating the image pickup apparatus according to the exemplary embodiment of the present invention.
Figure 18A:
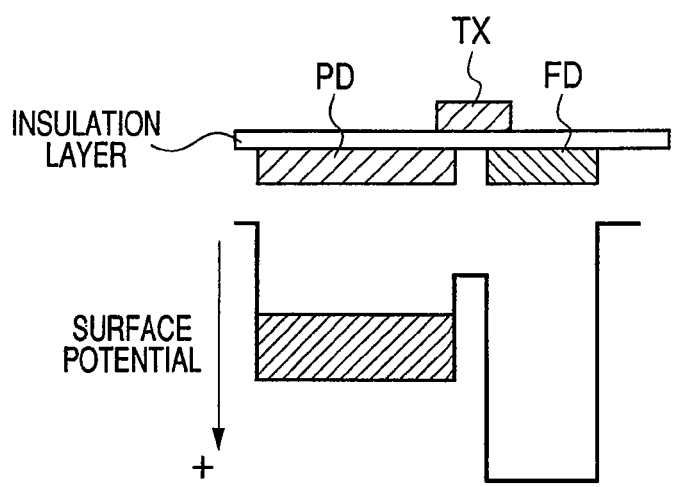
FIGS. 18A and 18B are figures illustrating a state in which signal charges accumulated in the PD leak into a unit of low potential barrier, when the signal charges exceed a saturation signal amount.
Figure 18B:
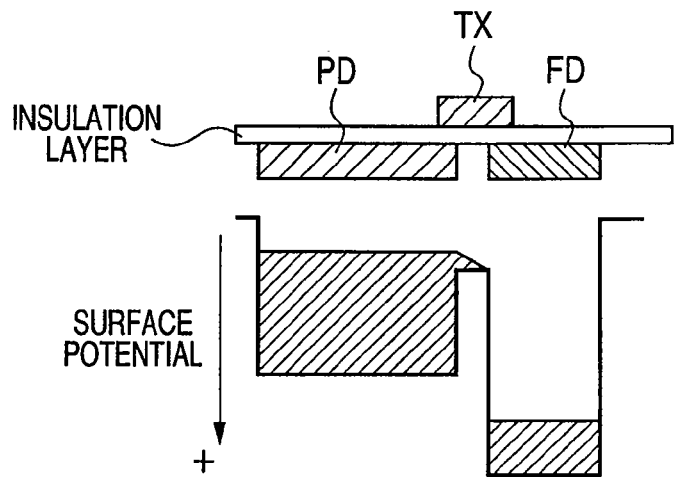
Figure 20:
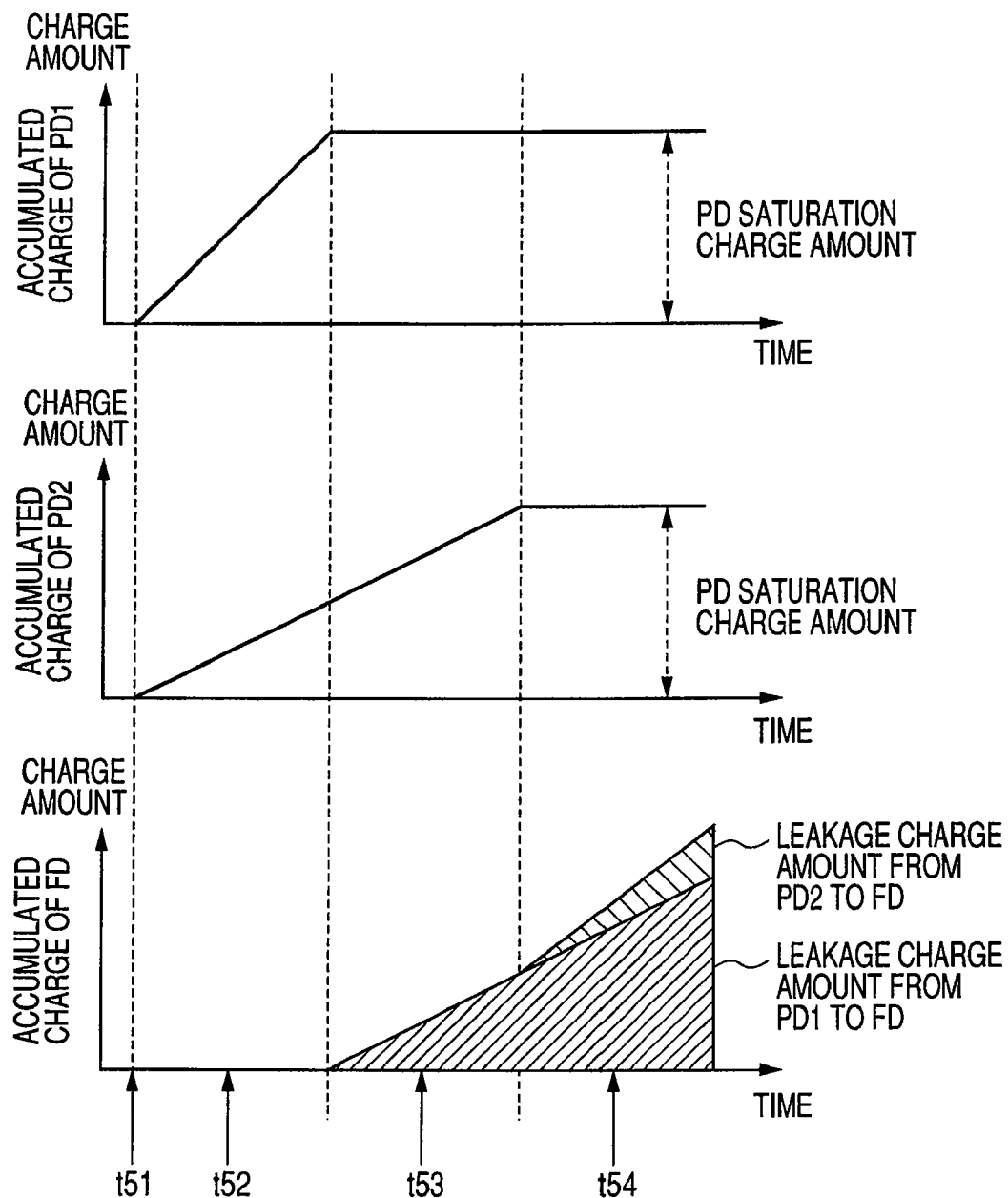
FIG. 20 is a figure describing a relation between accumulation time and a signal amount in a conventional image pickup device having units partially common to the two pixels.

Next, there is described an image pickup apparatus to which the image pickup unit 100 according to the present embodiment is applied. FIG. 17 is a figure illustrating an image pickup apparatus, such as a digital camera, according to the present embodiment.

A light beam is made incident on the image pickup unit 100 through an optical system 1 having an iris mechanism and lenses. A mechanical shutter 2 is arranged between the optical system 1 and the image pickup unit 100 or in the optical system 1. The optical system 1, the mechanical shutter 2, and the image pickup unit 100 are driven by a drive circuit 7. An A/D converter 5 converts an analog signal processed in a CDS circuit (CDS circuit 103 in FIG. 1) in the image pickup unit 100 to a digital signal. A timing signal generation circuit 6 generates a timing signal supplied to the image pickup unit 100, the CDS circuit 103 in FIG. 12, and the A/D converter 5. A signal processing circuit 8 performs various signal processings to the A/D converted image data in addition to the above described signal processing. An image memory 9 stores the image data subjected to the signal processing. A recording circuit 11 records in a recording medium 10 the image data subjected to the signal processing. A display circuit 13 supplies the image data subjected to the signal processing to an image display apparatus 12, and to make the image display apparatus 12 display the image data. A ROM 15 such as a nonvolatile memory stores a control program, control data such as a parameter and a table used in executing the control program, and correction data such as a defect address. The program, the control data and the correction data which are stored in the ROM 15 are transferred to a RAM 16, so as to be used by a control unit 14 which performs control of the whole image pickup apparatus. Prior to photographing operation, at a time when the control unit 14 starts to be operated, such as when the power source of the image pickup apparatus is turned on, a necessary program, control data, and correction data are transferred to the RAM 16 from the ROM 15.

According to a control signal sent from the control unit 14, the optical system 1 drives the iris and the lens, to enable an object image set to a proper brightness to be formed on the photoelectric conversion apparatus (photoelectric conversion apparatus 101 in FIG. 12) in the image pickup unit 100. Next, according to the control signal sent from the control unit 14, the mechanical shutter 2 is driven so as to shade the image pickup unit 100 in correspondence with the operation of the photoelectric conversion apparatus (photoelectric conversion apparatus 101 in FIG. 12) in the image pickup unit 100. At this time, when the image pickup unit 100 has an electronic shutter function, necessary exposure time may be secured by using the shutter function together with the mechanical shutter 2. The image pickup unit 100, which is driven by a driving pulse generated in the drive circuit 7 based on an operation pulse generated by the timing signal generation circuit 6 controlled by the control unit 14, converts the object image to an electric signal by photoelectric conversion, and outputs the signal as an analog image signal. The analog image signal output from the image pickup unit 100, whose clock synchronous noise is removed in the CDS circuit 103 in FIG. 12 based on the operation pulse generated by the timing signal generation circuit 6 controlled by the control unit 14, is converted to a digital image signal by the A/D converter 5. Next, in the signal processing circuit 8 controlled by the control unit 14, image processing such as color conversion, white balance and gamma correction, resolution conversion processing, image compression processing, and the like are performed to the digital image signal. The image memory 9 is used to temporarily store the digital image signal being subjected to the signal processing or to store the image data which is the digital image signal subjected to the signal processing. The image data subjected to the signal processing in the signal processing circuit 8, and the image data stored in the image memory 9 are converted in the recording circuit 11 to data (for example, file system data having a hierarchical structure) suitable for the image recording medium 10. Then, the data is stored in the recording medium 10 or subjected to the resolution conversion processing in the signal processing circuit 8. The data subjected to the resolution conversion processing is thereafter converted in the display circuit 13 to a signal (for example, analog signal of the NTSC system or the like) suitable for the image display apparatus 12, so as to be displayed in the image display apparatus 12.

Here, in the signal processing circuit 8, the digital image signal may not be subjected to the signal processing, but may be output as it is as image data to the image memory 9 or the recording circuit 11. Further, when there is a request from the control unit 14, the signal processing circuit 8 outputs to the control unit 14 information on the digital image signal and the image data, which is generated in the process of the signal processing. The information includes, for example, information on the spatial frequency of the image, the average value of a specified region, the amount of data of a compressed image and the like, or information extracted from these. Further, when there is a request from the control unit 14, the recording circuit 11 outputs information on a type, a free space and the like of the image recording medium 10 to the control unit 14.

Further, there is described a reproducing operation when an image data is recorded in the recording medium 10. The recording circuit 11 reads the image data from the recording medium 10 according to a control signal from the control unit 14. Similarly, when the image data is a compressed image, the signal processing circuit 8 performs image expansion processing of the image data according to the control signal from the control unit 14, and stores the processed data in the image memory 9. The image data stored in the image memory 9 is subjected to the resolution conversion processing in the signal processing circuit 8, and thereafter converted in the display circuit 13 to a signal suitable for the image display apparatus 12, so as to be displayed in the image display apparatus 12.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Laid-Open No. 2006-273416 filed on Oct. 4, 2006, and No. 2006-273417 filed on Oct. 4, 2006, which are hereby incorporated by reference herein in their entirety.

What is claimed is:

1. A photoelectric conversion apparatus comprising:

pixels arranged two-dimensionally, each of which includes a first photoelectric conversion device and a second photoelectric conversion device respectively adapted to photo-electrically convert light to charges, an accumulating unit adapted to temporarily accumulate the charges accumulated in the first and second photoelectric conversion devices, and an output unit adapted to convert the charges transferred from the first and second photoelectric conversion devices to the accumulating unit to a voltage and to output the voltage: and a control unit adapted, when an accumulated charge amount of the first photoelectric conversion device exceeds a saturation charge amount, to effect control in accordance with a first operation for discharging excess charges to the accumulating unit, and adapted, when an accumulated charge amount of the second photoelectric conversion device exceeds a saturation charge amount, to effect control in accordance with a second operation for discharging excess charges to a charge discharge area.

2. The photoelectric conversion apparatus according to claim 1, wherein the charge discharge area is arranged near the second photoelectric conversion device.

3. The photoelectric conversion apparatus according to claim 2, wherein the charge discharge area is also arranged near the first photoelectric conversion device.

4. The photoelectric conversion apparatus according to claim 3, further comprising:

a first transfer switch arranged between the first photoelectric conversion device and the accumulating unit;

a second transfer switch arranged between the second photoelectric conversion device and the accumulating unit;

a first charge discharge switch arranged between the first photoelectric conversion device and the charge discharge area; and a second charge discharge switch arranged between the second photoelectric conversion device and the charge discharge area, wherein the control unit supplies a voltage higher than a voltage supplied to the first charge discharge switch to the first transfer switch, when effecting the control in accordance with the first operation, and supplies a voltage lower than a voltage supplied to the second charge discharge to the second transfer switch, when effecting the control in accordance with the second operation.

5. The photoelectric conversion apparatus according to claim 1, wherein color filters of a plurality of colors are arranged on the pixels.

6. The photoelectric conversion apparatus according to claim 5, further comprising:
   a calorimetric unit different from the first and second photoelectric conversion devices; and
   a color decision unit adapted to determine a color having a high sensitivity among image information acquired by the calorimetric unit,
   wherein the control unit effects control to drive by the first operation a photoelectric conversion device provided with a color filter of the color which is determined to have the high sensitivity by the color decision unit, among the first and second photoelectric conversion devices.

7. The photoelectric conversion apparatus according to claim 5, further comprising a color decision unit adapted to determine a color having a high sensitivity based on image information acquired from the first and second photoelectric conversion devices before main photographing,
   wherein the control unit effects control to drive by the first operation a photoelectric conversion device provided with a color filter of the color which is determined to have the high sensitivity by the color decision unit, among the first and second photoelectric conversion devices.

8. An image pickup apparatus comprising:
   an optical system; and
   the photoelectric conversion apparatus according to claim 1.

9. A method for controlling a photoelectric conversion apparatus including pixels arranged two-dimensionally, each of which includes a first photoelectric conversion device and a second photoelectric conversion device respectively adapted to photo-electrically convert light to charges, an accumulating unit adapted to temporarily accumulate the charges accumulated in the first and second photoelectric conversion devices, and an output unit adapted to convert the charges transferred from the first and second photoelectric conversion devices to the accumulating unit to a voltage and to output the voltage, the method comprising:
   effecting control in accordance with a first operation for discharging excess charges to the accumulation unit, when an accumulated charge amount of the first photoelectric conversion device exceeds a saturation charge amount; and
   effecting control in accordance with a second operation for discharging excess charges to a charge discharge area, when an accumulated charge amount of the second photoelectric conversion device exceeds a saturation charge amount.

10. A photoelectric conversion apparatus comprising:
   pixel units arranged two-dimensionally, each of which includes a first photoelectric conversion device and a second photoelectric conversion device respectively adapted to photo-electrically convert light to charges, an accumulating unit adapted to temporarily accumulate the charges accumulated in the first and second photoelectric conversion devices, a first transfer switch arranged between the first photoelectric conversion device and the accumulating unit, a second transfer switch arranged between the second photoelectric conversion device and the accumulating unit, and an output unit adapted to convert the charges transferred from the first and second photoelectric conversion devices to the accumulating unit to a voltage and to output the voltage;
   a charge discharge area;
   a first charge discharge switch arranged between the first photoelectric conversion device and the charge discharge area; and
   a second charge discharge switch arranged between the second photoelectric conversion device and the charge discharge area,
   wherein while charges are accumulated in the first and second photoelectric conversion devices, a first voltage is supplied to the first charge discharge switch and the second transfer switch, and a second voltage different from the first voltage is supplied to the second charge discharge switch and the first transfer switch.

11. The photoelectric conversion apparatus according to claim 10, wherein when accumulated charge amounts of the first and second photoelectric conversion devices exceed respective saturation charge amounts, excess charges of the first and second photoelectric conversion devices are distributed to the accumulating unit and the charge discharge area, respectively.

12. The image pickup apparatus according to claim 11, wherein an image signal of one frame is generated by synthesizing an image signal based on the excess charges accumulated in the accumulating unit with an image signal based on the charges accumulated in the photoelectric conversion device in which the excess charges are generated.

13. The image pickup apparatus according to claim 10, wherein the first and second photoelectric conversion device are provided with color filters of a plurality of colors.

14. An image pickup apparatus comprising:
   an optical system; and
   the photoelectric conversion apparatus according to claim 10.

15. A method for controlling a photoelectric conversion apparatus including pixel units arranged two-dimensionally, each of which includes a first photoelectric conversion device and a second photoelectric conversion device respectively adapted to photo-electrically convert light to charges, an accumulating unit adapted to temporarily accumulate the charges accumulated in the first and second photoelectric conversion devices, a first transfer switch arranged between the first photoelectric conversion device and the accumulating unit, a second transfer switch arranged between the second photoelectric conversion device and the accumulating unit, and an output unit adapted to convert the charges transferred from the first and second photoelectric conversion devices to the accumulating unit to a voltage and to output the voltage, the method comprising:
   supplying a first voltage to a first charge discharge switch arranged between the first photoelectric conversion device and a charge discharge area, and the second transfer switch and supplying a second voltage different from the first voltage a second charge discharge switch arranged between the second photoelectric conversion device and the accumulating unit, and the first transfer switch, while charges are being accumulated in the first and second photoelectric conversion devices.

* * * * *